(12) United States Patent  
Kamani et al.

(10) Patent No.: US 9,841,264 B2  
(45) Date of Patent: Dec. 12, 2017

(54) TAPE RULE ASSEMBLY WITH A FLEXIBLE COVER AT OPENING IN HOUSING

(71) Applicant: STANLEY BLACK & DECKER, INC., New Britain, CT (US)

(72) Inventors: Chirag Kamani, West Hartford, CT (US); John Delneo, Middletown, CT (US); Antony Orsini, Oradell, NJ (US)

(73) Assignee: Stanley Black & Decker, Inc., New Britain, CT (US)

( * ) Notice: Subject to any disclaimer, the term of this patent is extended or adjusted under 35 U.S.C. 154(b) by 129 days.

(21) Appl. No.: 14/832,639

(22) Filed: Aug. 21, 2015

(65) Prior Publication Data

US 2016/0061573 A1 Mar. 3, 2016

Related U.S. Application Data

(60) Provisional application No. 62/042,063, filed on Aug. 26, 2014.

(51) Int. Cl.
*G01B 3/10* (2006.01)
*G01B 1/00* (2006.01)

(52) U.S. Cl.
CPC ............. *G01B 3/1056* (2013.01); *G01B 1/00* (2013.01); *G01B 3/1041* (2013.01); *G01B 3/1084* (2013.01)

(58) Field of Classification Search
CPC .......... G01B 3/1056; G01B 2003/1048; G01B 2003/1089; G01B 2003/1079; G01B 3/1071

(Continued)

(56) References Cited

U.S. PATENT DOCUMENTS 3,499,612 A  3/1970  Zelnick
3,519,219 A  7/1970  Zelnick
(Continued)

FOREIGN PATENT DOCUMENTS

EP  0 393 892 A2  10/1990
EP  1408300  4/2004
(Continued)

OTHER PUBLICATIONS

Extended European Search Report dated May 23, 2016, received for corresponding European application No. 15182583.3.

*Primary Examiner* — Yaritza Guadalupe-McCall
(74) *Attorney, Agent, or Firm* — Pillsbury Winthrop Shaw Pittman LL

(57) ABSTRACT

Disclosed is a rule assembly having a housing, a reel rotatably mounted in the housing, an elongated blade wound on the reel and extendable through an opening in the housing, and an end hook member attached to the elongated blade. A hook portion extends downwardly below a bottom surface of the housing when the blade is in a fully retracted position. The housing has an opening having an upper portion disposed above the blade, and a flexible cover overhanging the opening to inhibit or prevent penetration of debris therein. The cover is flexed by the end hook member upon impact by force (e.g., when dropped) and permits movement of the end hook member into the opening to reduce deformation of the end hook member. Optionally, a grip cover made of elastomeric material is provided on the housing and the cover is part of the grip cover.

32 Claims, 25 Drawing Sheets

(58) Field of Classification Search
USPC .................................................. 33/755–771
See application file for complete search history.

(56) References Cited

U.S. PATENT DOCUMENTS

| | | | |
|---|---|---|---|
| 3,519,220 A | 7/1970 | Zelnick | |
| 3,521,831 A | 7/1970 | Schmidt | |
| 3,578,259 A | 5/1971 | Zelnick | |
| 4,288,923 A | 9/1981 | Duda | |
| 4,479,617 A | 10/1984 | Edwards | |
| 4,603,481 A | 8/1986 | Cohen et al. | |
| 5,210,956 A | 5/1993 | Knispel et al. | |
| 5,395,069 A | 3/1995 | Chen | |
| 5,402,583 A | 4/1995 | Komura | |
| 5,588,220 A | 12/1996 | Cousins et al. | |
| 5,791,581 A | 8/1998 | Loeffler et al. | |
| 6,131,844 A | 10/2000 | Hsu | |
| 6,148,534 A | 11/2000 | Li | |
| 6,276,071 B1 * | 8/2001 | Khachatoorian | G01B 3/1005 33/767 |
| 6,282,808 B1 | 9/2001 | Murray | |
| 6,349,482 B1 * | 2/2002 | Gilliam | G01B 3/1005 33/755 |
| 6,467,182 B2 | 10/2002 | Usami | |
| 6,598,310 B1 | 7/2003 | Odachowski | |
| 6,874,245 B2 | 4/2005 | Liu | |
| 7,003,895 B2 | 2/2006 | Harris et al. | |
| 7,458,536 B2 | 12/2008 | Hui | |
| 7,584,549 B2 | 9/2009 | Lee et al. | |
| 8,117,763 B2 | 2/2012 | Delneo et al. | |
| 8,375,595 B2 | 2/2013 | Murray et al. | |
| 8,528,222 B2 | 9/2013 | Murray et al. | |
| 2012/0036727 A1 | 2/2012 | McCarthy | |
| 2012/0167403 A1 * | 7/2012 | Roeske | G01B 3/1041 33/769 |
| 2013/0047455 A1 | 2/2013 | Steele | |
| 2013/0055578 A1 | 3/2013 | Johns | |
| 2016/0003602 A1 * | 1/2016 | Zelenack, Jr. | G01B 3/1041 33/769 |
| 2016/0061573 A1 * | 3/2016 | Kamani | G01B 3/1056 33/768 |

FOREIGN PATENT DOCUMENTS

| | | |
|---|---|---|
| GB | 2455656 | 6/2009 |
| JP | H06147802 | 5/1994 |

* cited by examiner

TAPE RULE ASSEMBLY WITH A FLEXIBLE COVER AT OPENING IN HOUSING

CROSS REFERENCE TO RELATED APPLICATION(S)

This application claims priority to U.S. Provisional Patent Application No. 62/042,063, filed Aug. 26, 2014, which is hereby incorporated by reference in its entirety.

BACKGROUND

Field

The present disclosure is generally related to a tape rule assembly.

Description of Related Art

A typical tape rule assembly includes an elongated metal rule blade that is mounted on a reel rotatably disposed within a housing. The rule blade is retracted into the housing for storage by coiling it about the reel. To measure a work-piece, a length of the rule blade is pulled out of the housing to span the distance to be measured and the blade or hook is held against the work-piece so that gradation lines and numbers printed on the blade can be read against a point on the work-piece. To measure a distance between two objects or surfaces, an end hook at the free end of the blade may be temporarily secured or placed against an object or surface. The hook includes a hook portion that extends downwardly at an essentially right angle from a mounting portion of the hook that is mounted on the end of the blade. When the hook of the retracted blade is at the opening, the downwardly extending hook portion extends below a bottom end surface of the housing assembly adjacent the opening. In addition, long tape assemblies are known in which an elongated tape is wound on a reel and can be extended to measure distances. These long tape assemblies may also utilize an end hook.

It is convenient for the user to have the hook portion of the blade extend below the bottom surface of the housing assembly, so that, for example, the retracted blade can be easily withdrawn from the housing assembly by grasping the hook portion or hooking the hook portion over an edge or corner of an object or workpiece. The hook aids the tape assembly user when taking a measurement by securing the free end of the blade while the measurement is taken. The hook is precisely manufactured and mounted to assure accurate measurements.

In instances where a tape rule assembly is dropped, the hook portion may be impacted by contact with the floor or ground or other surface. For example, FIGS. 21A and 21B show examples of how a hook portion of a tape rule assembly can be impacted by a substantially vertical force F or a substantially angular force F2 when a tape rule assembly contacts and hits the ground G. The impact by such force F and/or force F2 can cause damage to the hook portion.

If the hook is damaged by being bent so that the hook portion is misshapen or no longer at an essentially right angle with the free end of the blade, a measurement read while securing the blade with the hook portion may not be accurate. Because a portion of the blade hook extends below the bottom end surface of the housing assembly when the blade is fully retracted, the hook is especially vulnerable to damage if the tape assembly is dropped or otherwise impacted when the blade is retracted under the force of the tape assembly spring. If the lower edge of the hook portion is impacted in a direction that causes the free end to move upwardly with respect to the housing assembly, the hook portion may permanently bend relative to the mounting portion if, during impact, the mounting portion of the hook is prevented by downwardly facing surfaces on the housing assembly that define the housing assembly opening from moving upwardly a sufficient distance with respect to the opening. Thus, the size (e.g., height) of the opening can impact the amount of damage to the blade hook during impact as discussed in U.S. Pat. No. 6,282,808, hereby incorporated by reference in its entirety.

SUMMARY

Disclosed is a tape assembly that includes a flexible cover in its mouth opening that is constructed and arranged to protect the hook from bending if the hook at the housing opening is impacted by receiving a portion of the end hook into an upper portion of the opening. The tape assembly also is constructed and arranged to absorb any force applied to the end hook as well as inhibit and/or prevent debris from entering the opening.

It is an aspect of this disclosure to provide a rule assembly. The assembly includes: a housing; a reel rotatably mounted in the housing; an elongated blade arranged to be wound on the reel and having a free end configured to extend through an opening in the housing; and an end hook member attached to the free end of the elongated blade, the end hook member including a mounting portion connected to the free end of the elongated blade and a hook portion extending generally perpendicularly from the mounting portion at the free end of the elongated blade. The hook portion is constructed and arranged to extend downwardly below a bottom surface of the housing when at the opening in the housing, when the elongated blade in a fully retracted position. The opening has an upper portion disposed above the elongated blade and the mounting portion when the elongated blade is in the fully retracted position. The housing has a flexible cover overhanging the upper portion of the opening to inhibit penetration of debris into the opening. The flexible cover is positioned to be flexed by the end hook member upon impact by force thereon to absorb force from the impact and permit movement of the end hook member into the upper portion of the opening.

Another aspect of this disclosure is to provide a rule assembly. The rule assembly has: a housing; a reel rotatably mounted in the housing; an elongated blade arranged to be wound on the reel and having a free end configured to extend through an opening in the housing; and an end hook member attached to the free end of the elongated blade, the end hook member including a mounting portion connected to the free end of the elongated blade and a hook portion extending generally perpendicularly from the mounting portion at the free end of the elongated blade. The hook portion is constructed and arranged to extend downwardly below a bottom surface of the housing when at the opening in the housing, when the elongated blade is in a fully retracted position. The opening has an upper portion disposed above the elongated blade and the mounting portion when the elongated blade is in the fully retracted position. The rule assembly also has a flexible cover covering at least partially the upper portion of the opening to inhibit penetration of debris into the opening. The flexible cover is configured to be flexed at least ⅛" upon impact that forces the free end of the blade upwards when the elongated blade is in the fully retracted position.

Yet another aspect of this disclosure provides a rule assembly that has: a housing; a reel rotatably mounted in the housing; an elongated blade arranged to be wound on the reel and having a free end configured to extend through a mouth in the housing; and an end hook member attached to the free end of the elongated blade, the end hook member including a mounting portion connected to the free end of the elongated blade and a hook portion extending generally perpendicularly from the mounting portion at the free end of the elongated blade. The hook portion is constructed and arranged to extend downwardly below a bottom surface of the housing when at the mouth in the housing, when the elongated blade is in a fully retracted position. The rule assembly also has an attachment assembly configured to be attached at the free end of the elongated blade, and a flexible cover disposed above the elongated blade and the attachment assembly when the elongated blade is in the fully retracted position to inhibit penetration of debris into the housing. The flexible cover is positioned to be flexed by the attachment assembly upon impact by force on at least the end hook member when the elongated blade is in the fully retracted position to absorb force from the impact and permit movement of the end hook member in the vertical direction.

Other aspects, features, and advantages of the present disclosure will become apparent from the following detailed description, the accompanying drawings, and the appended claims.

DETAILED DESCRIPTION OF THE PREFERRED EMBODIMENT(S)

The disclosed assembly improves, among other things, the drop resistance of the hook as well as reduces the deformation of the hook during impact.

FIGS. 1-6 show a rule assembly 10 in accordance with various embodiment of the present disclosure. The rule assembly shown in FIGS. 1-6 can, for example, be of the type illustrated and described in U.S. Pat. No. 8,117,763, issued Feb. 21, 2012, entitled "Tape Rule and End Hook Therefore", incorporated herein by reference in its entirety. The rule assembly can be one of the type illustrated and described in U.S. Pat. No. 6,282,808, issued on Sep. 4, 2001, which is hereby incorporated by reference in its entirety. The rule assembly can alternatively be one of the type illustrated and described in U.S. Pat. No. 8,528,222, issued on Sep. 10, 2013, and/or U.S. Pat. No. 8,375,595, issued on Feb. 19, 2013, both of which are incorporated herein by reference in their entirety.

It should be expressly recognized and appreciated, however, that the description and illustrations relating to FIGS. 1-6 are examples only, and that the present disclosure applies much more broadly to elongated tape rule devices of many kinds and sizes, and having blades of different possible materials.

Figure 4:
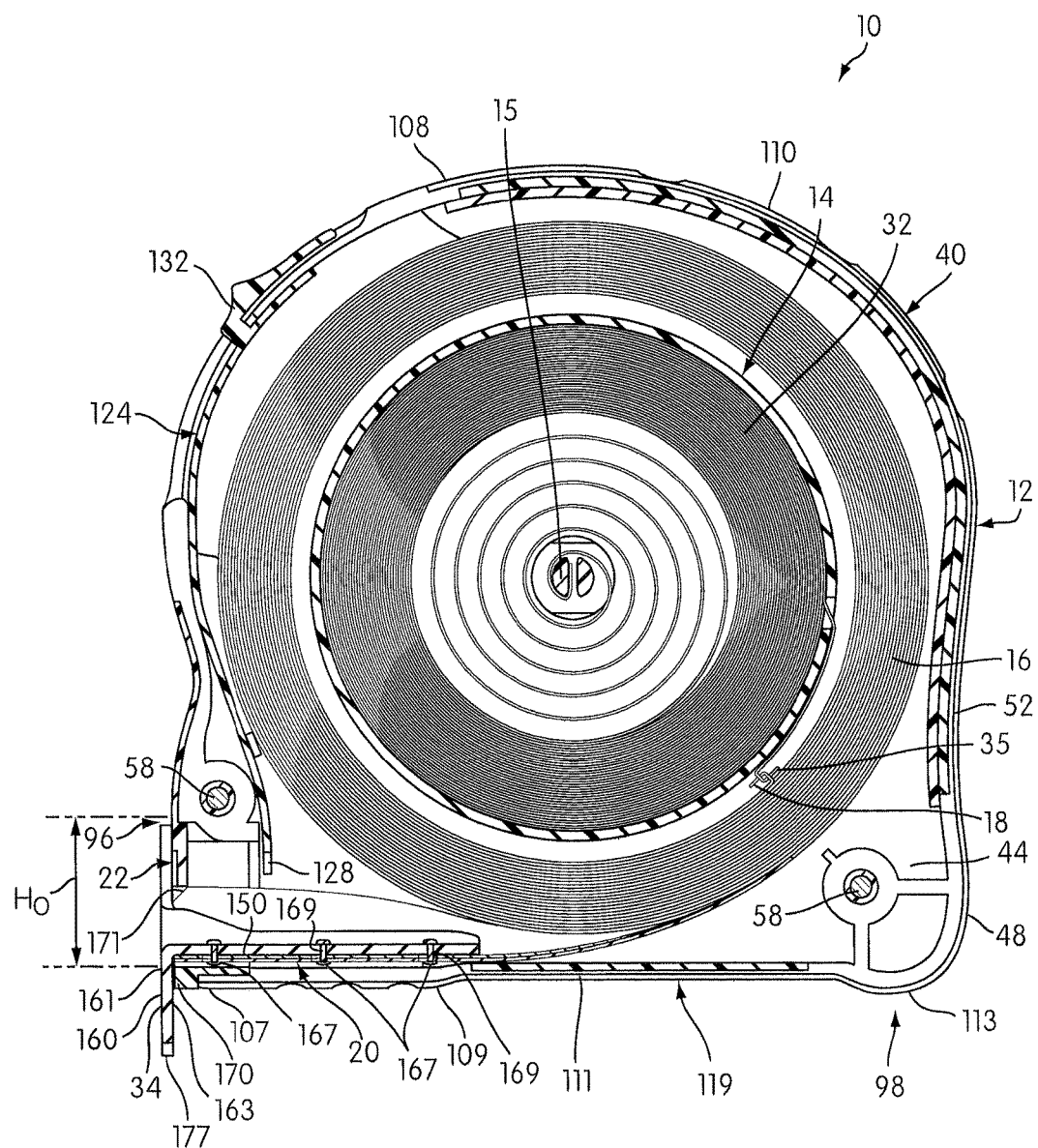
FIG. 4 shows a cross-sectional view of the tape rule assembly taken through the line 4-4 in FIG. 2 showing a blade thereof in a fully retracted configuration in accordance with an embodiment of the present disclosure.
Figure 5:
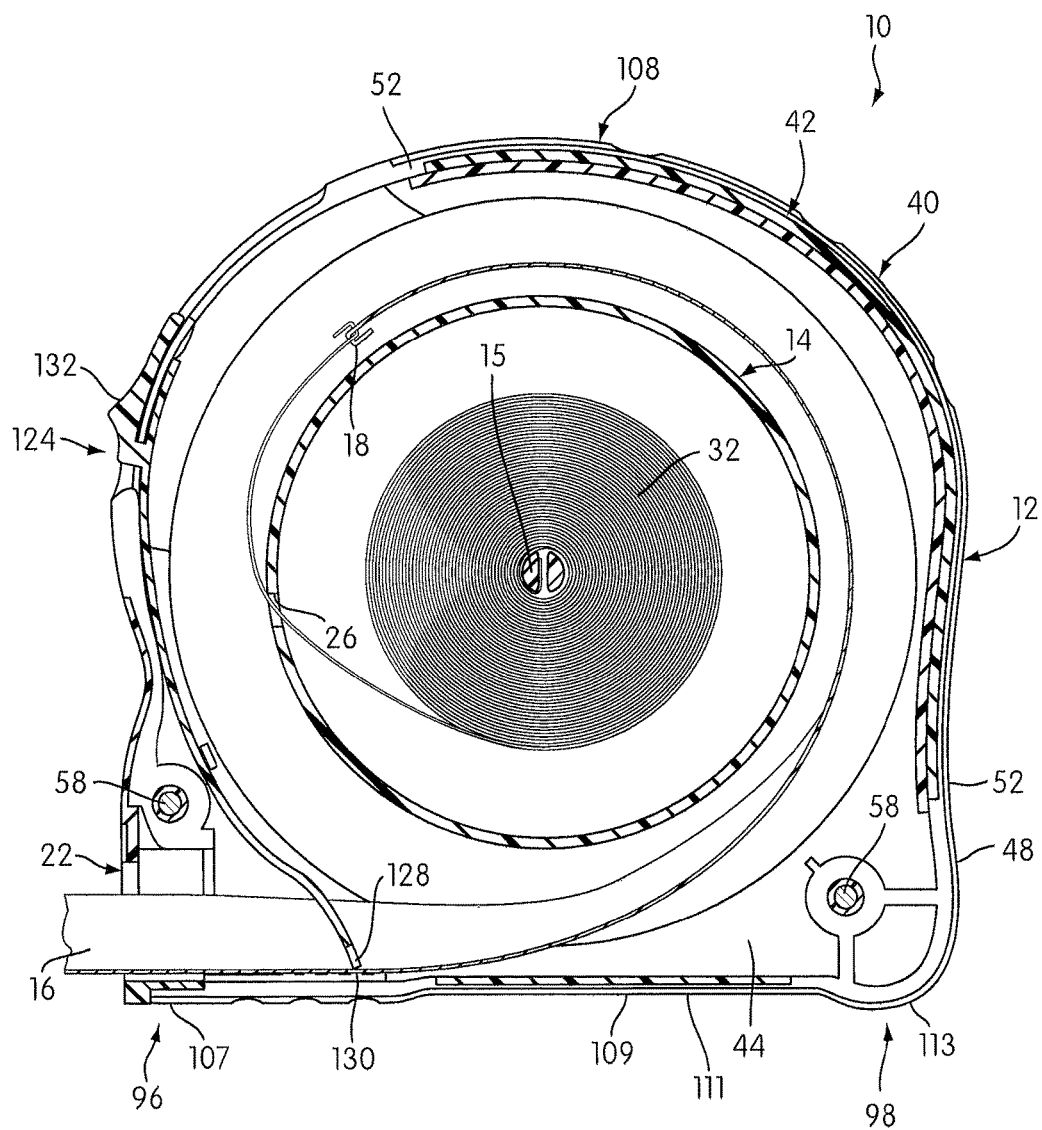
FIG. 5 is a view similar to FIG. 4 except showing the blade in a fully extended configuration in accordance with an embodiment of the present disclosure.

In general, the rule assembly 10 includes a housing 12, a reel 14 (as shown in FIGS. 4 and 5) rotatably mounted in the housing 12, and an elongated blade 16 having an end hook member 34 on a free end 20 thereof. The elongated blade 16 is arranged to be wound on the reel 14 and has a free end configured to extend through an opening 22 and mouth 25 in the housing 12.

Figure 6:
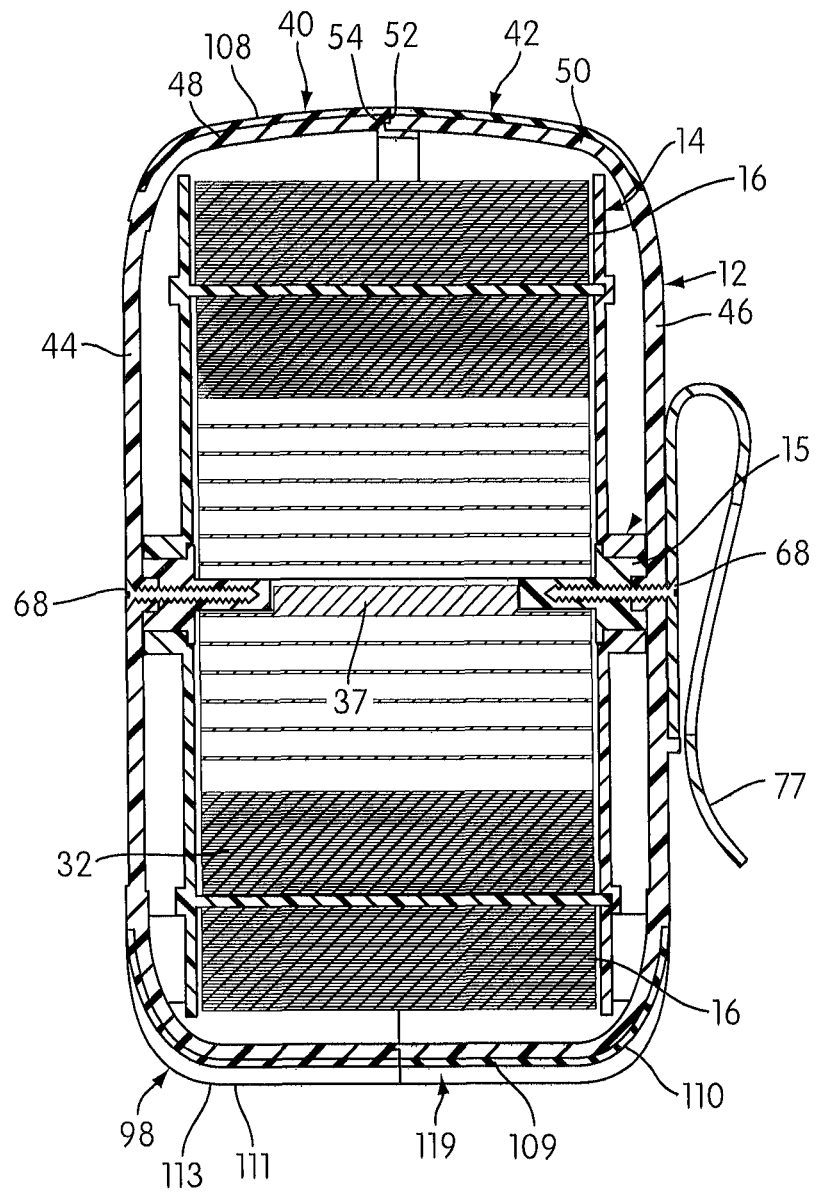
FIG. 6 is a cross-sectional view taken through the line 6-6 in FIG. 3.

The reel 14 is mounted in the housing 12 by a reel spindle 15 that is secured within the housing 12 (FIGS. 4-6). An elongated tape rule blade 16 is mounted on the reel 14.

The blade 16 is formed of a ribbon of metal, e.g., steel, and the top concave surface of the blade is printed with measuring lines and digits (not shown) for measuring lengths and distances. One longitudinal end 18 of the blade 16 is connected to the reel 14 and a second longitudinal free end 20 of the blade 16 (that is opposite to the connected end 18) that is arranged to be extendable generally outwardly of the housing 12 through the opening 22. The "free end" 20 of the elongated blade 16 generally refers to an end region of the blade 16, such end region being configured for receipt of and/or connecting with an end hook member 34, one or more rivets 169, and (optionally) one or more attachment assemblies (e.g., such as attachment assembly 250 to be described herein). The blade 16 is constructed and arranged with respect to the housing 12 to extend generally from a position tangential of the reel 14 outwardly through a spaced opening 22 provided in the housing 12 (as shown, for example, in a longitudinal direction L in FIG. 1). The blade 16 can be extended from the housing by pulling on the free end of the elongated blade 16 (e.g., via grasping the end hook member 34).

Figure 1:
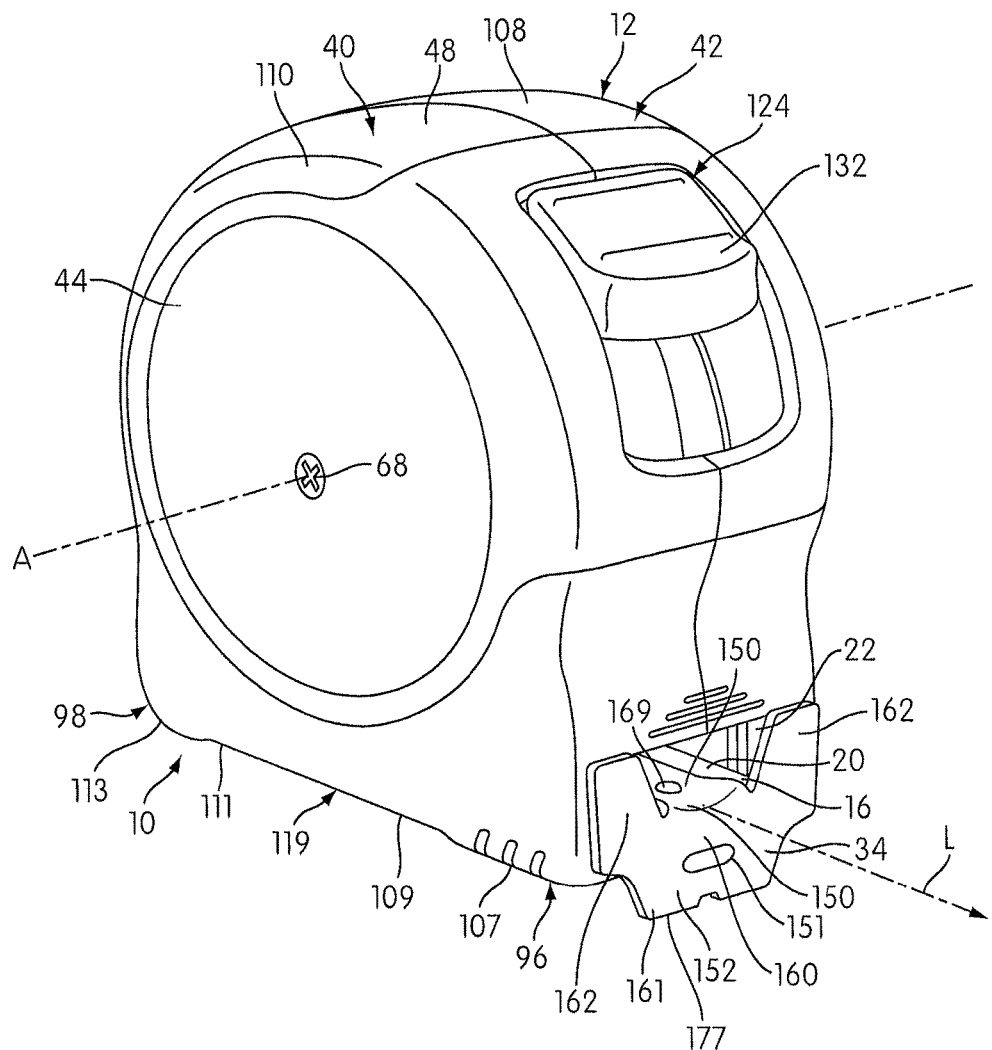
FIG. 1 shows a perspective view of a rule assembly in accordance with an embodiment of the present disclosure.
Figure 3:
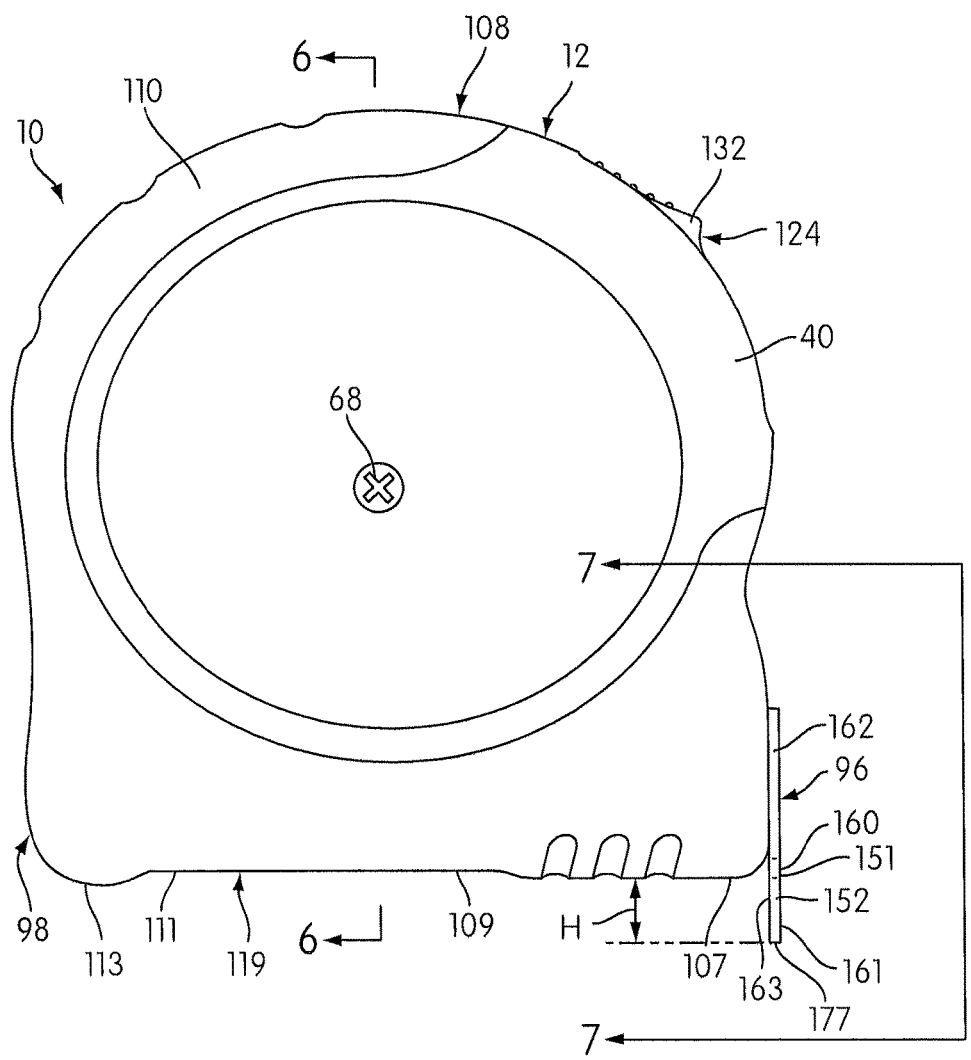
FIG. 3 shows a side of elevational view of the rule assembly in accordance with an embodiment of the present disclosure.

The blade 16 is generally movable between a fully retracted position outwardly of the housing 12 to a fully extended position (moved or pulled in a longitudinal direction, L). The fully retracted position of the blade 16 is shown in FIG. 4 and the fully extended position of the blade is shown (in fragmentary view) in FIG. 5. When the blade 16 is fully retracted into the housing 12 (e.g., such as shown in FIGS. 1, 3 and 4), the blade 16 may be extracted by pulling the hook member 34 from behind its lower edge (i.e., below the blade 16). In one embodiment, the end hook member 34 gives the user access to extract the hook member 34 from its side edges as well. It can be appreciated from a comparison of FIG. 4 and FIG. 5 that as the blade is unwound from the reel 14, the coil spring 32 is wound around the rigidly fixed spindle 15. This winding of the spring around the spindle stores energy in the spring to provide spring powered rewinding of the blade 16 around the reel 14 when the extended blade is released.

The details of the internal structure of the housing 12 and the blade 16 mounted therein are shown in FIGS. 4-6. In one embodiment, the housing 12 and the reel 14 are constructed of a molded plastic. As best appreciated from FIG. 6, the housing 12 includes a pair of cooperating molded plastic housing members 40, 42. Each housing member 40, 42 includes an end wall 44, 46, respectively, having a peripheral wall 48, 50, respectively, extending from a periphery thereof and terminating in a free edge 52, 54, respectively. The housing members 40, 42 are fixed together in the assembled rule assembly 10 by a plurality of axially extending bolts 58 extending through one of the housing members (e.g., member 42) and threadedly engaging the other housing member (e.g., member 40). The housing members 40, 42 are also fixed together by the threaded engagement of bolts 68 with the fixed reel spindle 15. The axially extending spindle 15 is fixed at a central portion of the housing assembly 12. The top portion 108 of the housing 12 can be made to have a relatively arcuate profile (FIG. 2, for example) that generally conforms to the profile of the reel, in accordance with embodiments. A metal clip 77 is secured to one side of the housing assembly by one of the bolts 68.

In accordance with an embodiment, a peripheral portion of housing 12 is provided with a grip cover 110 or coating thereon. The grip cover 110 or coating may be made of elastomeric material, e.g., rubber or a rubber-like polymeric material that is overmolded onto the housing 12, and provided in any number of locations on the housing, such as around the gripped portion of the housing 12 and near the opening 22 of the tape rule assembly 10.

Figure 7:
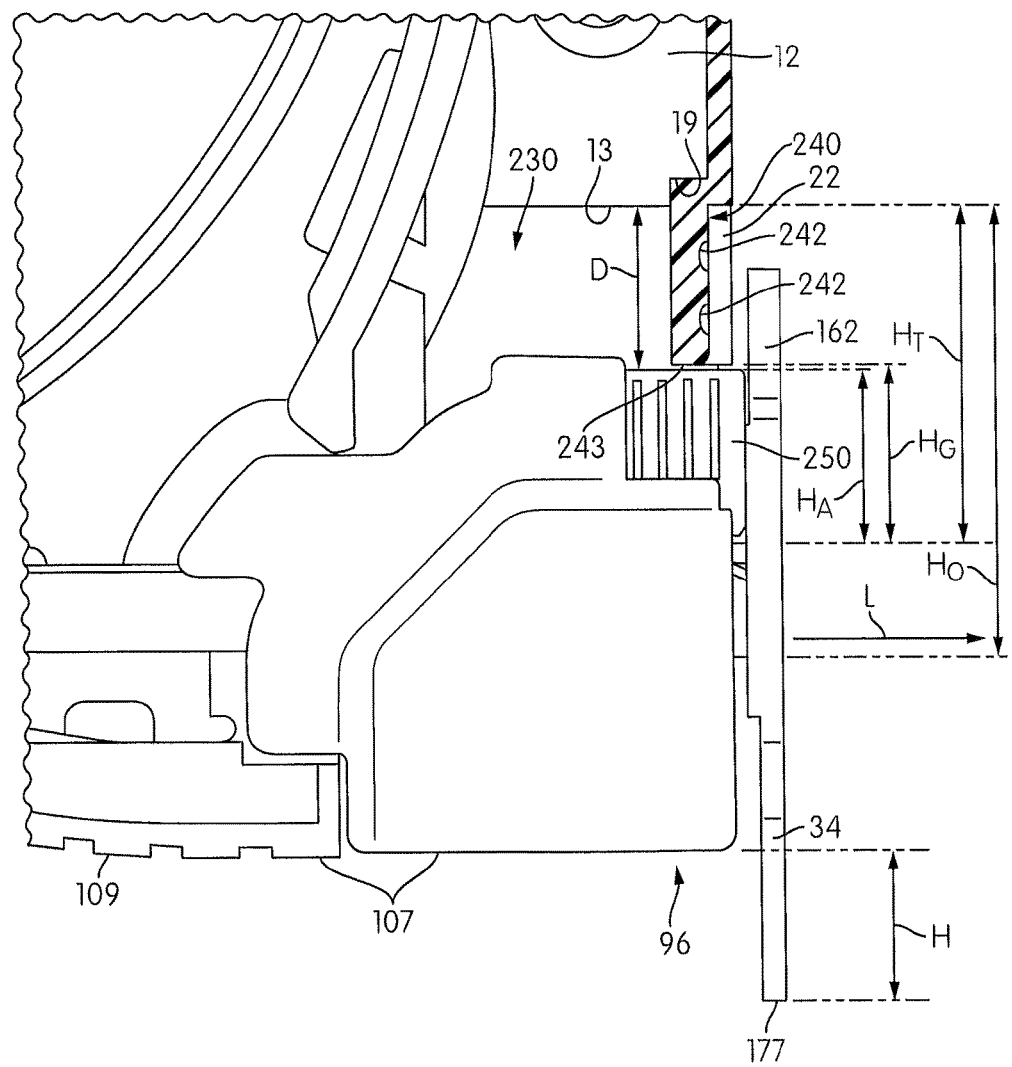
FIG. 7 is a detailed cross-sectional view of the opening, flexible cover, and end hook member of the rule assembly in FIG. 4 with the blade in a fully retracted configuration in accordance with an embodiment of the present disclosure.
Figure 7A:
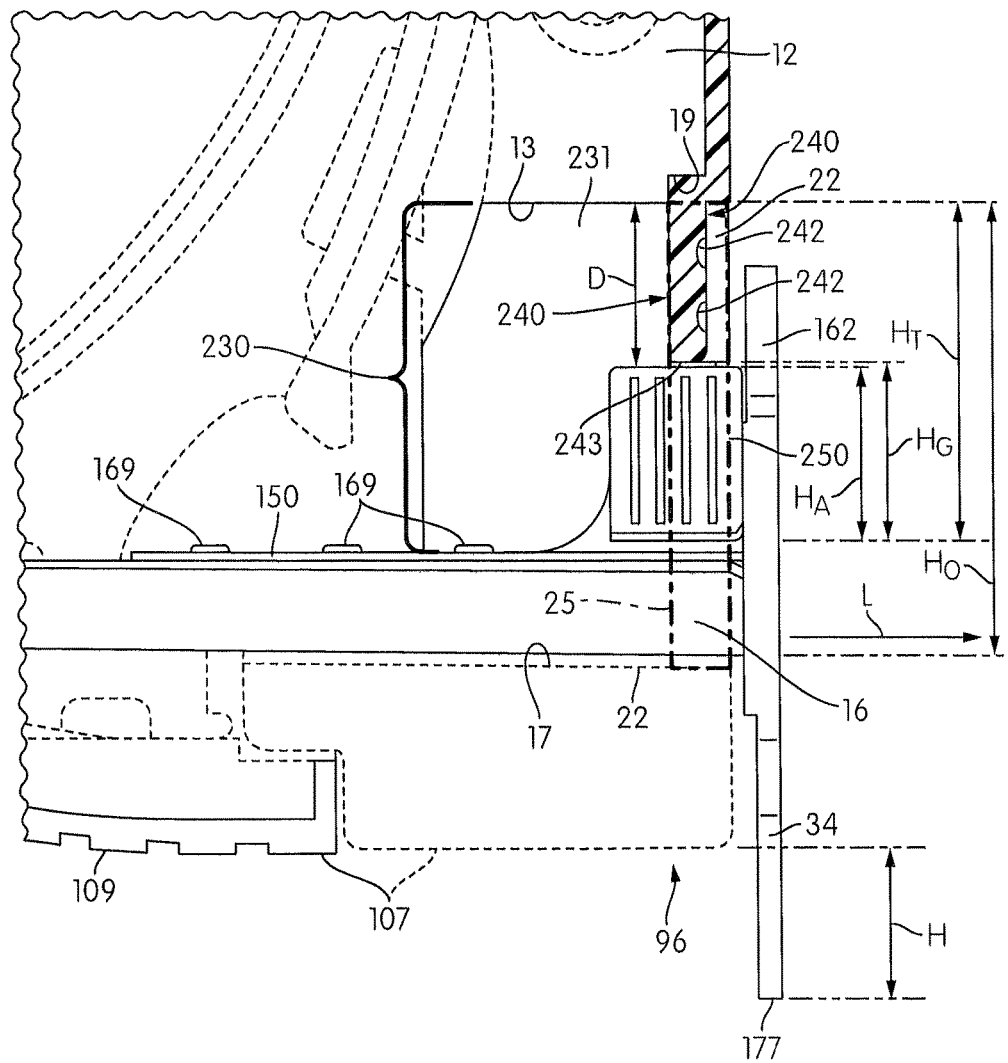
FIG. 7A is a detailed cross-sectional view of the rule assembly of FIG. 7 in a first position with some parts removed to show further details of the opening, an upper portion of the opening, a mouth of the opening, the flexible cover and the end hook member in accordance with an embodiment of the present disclosure.

The housing 12 includes a bottom wall 109 (FIGS. 1 and 4-5) having an exterior portion 107 at a forward end position (at a corner 96) adjacent (below) the housing opening 22 (and mouth 25 as illustrated in FIG. 7A). One corner 96 is adjacent the housing assembly opening 22 and the other corner portion 98 is at an opposite bottom end of the housing assembly 12. An exterior surface portion 111 extends from the forward end portion 107 at corner 96 toward an opposite end 113 (at corner 98) of the bottom wall 109 to provide a finger grip enhancing configuration, generally designated 119 for a gripping hand of the user. That is, the bottom wall 109 has a forward end portion 107 adjacent the housing opening 22 and a rearward end portion 113 at the opposite end of the bottom wall 109. In an embodiment, the surface portion 111 of the wall 109 therebetween may be generally recessed to provide the finger grip enhancing configuration 119 for the gripping hand of the user. This recessed area or gripping area of the finger grip enhancing configuration 119 on the bottom of the housing 12 is, in one embodiment, completely covered with an overmolded rubber or rubber-like polymeric material (e.g., TPE, TPU) and may be formed with the grip cover 110.

Figure 2:
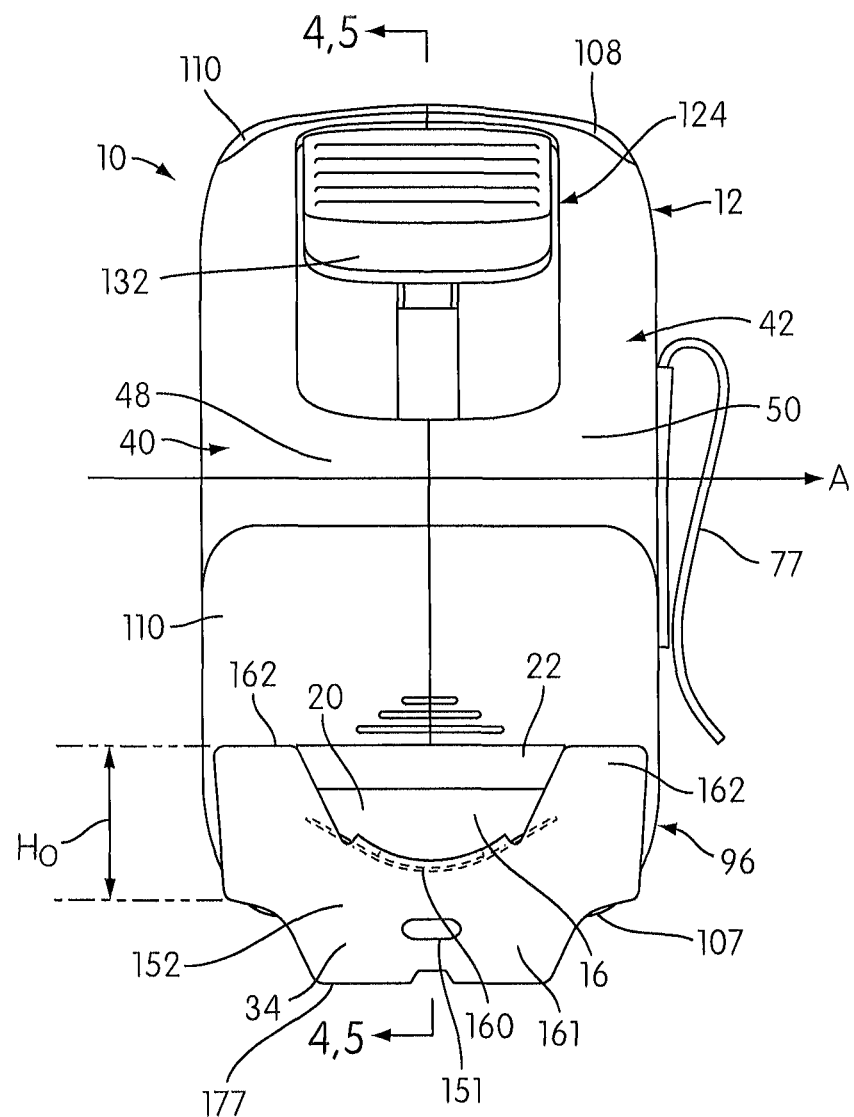
FIG. 2 shows a front of elevational view of the rule assembly in accordance with an embodiment of the present disclosure.

A holding assembly, generally designated to 124, is constructed and arranged to be manually actuated to hold the blade 16, using a holding member 128 mounted on the housing 12, in any position of extension outwardly of the housing opening 22 and to release the blade 16 from any position in which it is held. The holding member 128 has an exterior thumb engaging portion 132 configured to be moved digitally to selectively move an interior holding structure 130 (FIG. 5) of the holding member 128 between its normally inoperative position and its holding position, as shown in FIGS. 4 and 5, respectively. The exterior thumb engaging portion 132 is best seen in FIGS. 1-2. Such features are not described in great detail herein as one of ordinary skill in the art understands how the holding assembly 124 is used and moved between its positions to release and hold the blade 16. It should be appreciated that other holding assemblies, such as those that automatically hold the blade 16 in a position of extension, and are manually actuated to release the blade can also be used. In yet another embodiment, no holding assembly need be provided.

As shown in FIGS. 1-4, an end hook member 34 is attached to the free end 20 of the elongated blade 16. The end hook member 34 includes a mounting portion 150 connected to the free end 20 of the elongated blade 16 (in overlying relation thereto) and a hook portion 152 extending generally perpendicularly from the mounting portion 150 at the free end 20 of the elongated blade 16. The hook portion 152 can be bent at a generally right angle from an end of the mounting portion 150. In one embodiment, the connection between the blade 16 and the mounting portion 150 may permit limited sliding movement therebetween. The hook portion 152 may include an opening 151 or hole therein to help temporarily secure an end of the hook portion 152 to an object (e.g., via insertion of a pin or nail through the opening 151).

In one embodiment, the hook portion 152 of end hook member 34 is constructed and arranged to extend downwardly below a bottom wall 109 or surface of the housing 12 when at the opening 22 (or mouth) in the housing 12, when the elongated blade 16 in a fully retracted position. As shown in FIG. 7, a portion of the hook portion 152 that extends downwardly below the bottom surface 109 or wall of the housing 12 has a height dimension of H (height H is defined as the distance between the bottom surface 109 or wall of the housing 12 and the bottom edge 177 of the hook portion 152).

In one embodiment, the end hook member 34 is formed of, for example, a sheet metal material (such as steel), of a predetermined thickness, that is stamped or otherwise formed into a desired shape.

In one embodiment, the mounting portion 150 has a generally concavo-convex configuration (e.g., to match the concavo-convex curvature of the blade 16). In another embodiment, the mounting portion 150 has a generally flat configuration.

The mounting portion 150 is provided with holes 167 that may be substantially aligned with openings in the elongated blade 16. A plurality of rivets 169 extend through the holes 167 and openings in the blade 16 to slidably mount the end hook member 34 to the blade 16 for limited longitudinal relative movement between the end hook member 34 and the blade 16 (i.e., the diameter of each hole 167 is greater than the diameter of the associated rivet 169 by an amount approximately equal to the desired amount of hook movement). The limited sliding engagement allows the blade 16 to be measured externally from an external surface 161 of the hook portion 152 or internally from an internal surface 163 of the hook portion 152. In other words, the sliding movement of the end hook member 34 allows an accurate measurement to be taken with either surface 161 or 163 in abutting relation with a workpiece. The end hook member 34 may slide longitudinally with respect to the blade 16 a distance approximately equal to the thickness of the hook portion 152 (where the thickness is measured from surface 161 to surface 163) so that a measurement taken with either surface 161 or 163 in abutting engagement with the work-piece will yield an accurate measurement.

The dimensions and features of the tape measure mechanism, housing, blade and/or hook member should not be limiting. For example, in some embodiments, the end hook member 34 may be designed with top catching capability, which generally refers to the ability of a portion of the end hook member 34 to hookingly engage with a work-piece to facilitate extension of the blade 16 and to temporarily secure the blade to the work-piece while a measurement is being taken. In such an embodiment, the portion of the end hook member 34 may be a) located above the blade 16 and/or b) located above and to the side of the blade 16. In one embodiment, the hook portion 152 is substantially U-shaped. In another embodiment, the hook portion 152 of the hook member 34 provides an under-catch structure and/or a side catch structure that can hookingly engage a work-piece to facilitate extension of the blade 16 and to temporarily secure the blade to the work-piece while a measurement is being taken. In yet another embodiment, the hook portion 152 may comprise burred portions (e.g., to provide a gripping attribute to edges of the hook member 34). Also, the spacing and depiction of the rivets 169 should not be limited to the illustrated embodiments. For example, the two or more rivets may be positioned such that they are equidistant.

In one embodiment, the U-shaped hook portion 152 includes a bight section 160 and spaced leg sections 162 extending upwardly from the bight section 160. In one embodiment, the bight section 160 of the U-shaped hook portion 152 is configured to extend downwardly, below a convex side of the free end 20 of the blade 16. The bight section 160 of the hook portion 152 of the hook member 34 provides an under-catch structure that can hookingly engage a work-piece to facilitate extension of the blade 16 and to temporarily secure the blade to the work-piece while a measurement is being taken.

In one embodiment, the leg sections 162 extend laterally outwardly beyond the longitudinally extending edges of the blade 16 to provide a side catch surface on each side of the blade 16 that can be used to hook the blade 16 to an object or work-piece. The side catch structure provided by the legs 162 can function to secure the free end 20 of the blade 16 during a measurement. The side catch structure provided by the leg sections 162 also allow the blade 16 to be easily and steadily held in a tilted position relative to a surface of the work-piece, thereby allowing a longitudinally extending edge of the blade 16 to be held against the work-piece.

In one embodiment, the leg sections 162 extend laterally beyond transversely spaced corners 171 of the free end 20 of the blade 16. In one embodiment, the corners 171 at the front edge of the blade are chamfered or angled.

In one embodiment, the upper portions of the leg sections 162 extend generally upwardly and outwardly above the concave side of the blade 16 to provide structure above the concave surface of the blade 16 to hookingly engage the work-piece to facilitate extension of the blade 16 and to hold the free end 20 of the blade 16 while a measurement is being read. For example, the blade 16 can be placed against a work-piece such that the concave side of the blade 16 is facing the work-piece and such that the opposite longitudinal edges of the blade 16 abut a surface on the work-piece at a point where they measurement is to be read. When the blade 16 is in this position, the upwardly extending portions of the legs 162 on the hook member 34 can be used to hold the free end 20 of the blade 16 against the work-piece.

In one embodiment, the leg sections 162 extend upwardly above both the mounting portion 150 and the spaced corners 171 of the free end 20 of the blade 16.

Further details of the construction of the housing opening 22 and interior of the housing 12 adjacent to the opening 22 can be appreciated from FIGS. 2, 4 and 7. The housing opening 22 has a height dimension $H_O$, as seen in FIG. 2 and FIG. 4, for example. As shown in FIG. 7A, the height $H_O$ of the opening 22 extends between surfaces 13 and 17 of top and bottom structural rigid portions (respectively) of the housing 12 through which the elongated blade 16 and end hook member 34 extend, allowing the blade 16 to be moved between fully retracted and extended positions. More specifically, the top surface 13 of the opening 22 is defined in one embodiment as the part where the structural rigid portion of the housing 12 ends and a flexible portion, e.g., flexible cover 240 (as further described below), begins. The bottom surface 17 of the opening 22 is defined in one embodiment as the surface in which the blade 16 is adjacent to and/or rests on when the blade 16 is in the fully retracted position. In one embodiment, the surfaces 13 and 17 can be more truncated so as to occupy only the mouth region 25 discussed later. In one embodiment, a rigid portion 19 of the housing 12, also discussed later, is the top surface of the opening 22.

The opening 22 of the housing 12 has an upper portion 230, as shown in FIG. 7A, so as to be disposed above the elongated blade 16 and the mounting portion 150 when the blade 16 is fully retracted. More specifically, the upper portion 230 of the opening 22 includes the space between the upper surface of the blade 16 and a top surface 13 of the relatively structural rigid portion of the housing 12 that defines a top of the opening 22 in the housing 12. The upper portion 230 has a height dimension $H_T$, as seen in FIG. 7 and FIG. 7A, for example. Additional features relating to the opening 22 and upper portion 230 of the opening are noted later.

The housing also has a flexible cover 240 or flange. The flexible cover 240 is disposed above a free end of the elongated blade 16, and above or adjacent a top concave surface or side of the blade 16. In an embodiment, the flexible cover 240 overhangs at least a part of, if not the entirety of, the upper portion 230 of the opening 22 or mouth. The flexible cover 240 inhibits and/or substantially prevents penetration of debris or dirt into the housing through the upper portion 230 of the opening 22. The flexible cover 240 is positioned to be flexed or compressed by the end hook member 34 (directly or indirectly) upon impact by force thereon (e.g., from impact, e.g., when dropped to the floor or ground) and permits movement the end hook member 34 into at least the upper portion 230 of the opening 22. In accordance with an embodiment, as described below, the flexible cover 240 may also or alternatively be flexed or compressed by an attachment assembly 250 mounted above the mounting portion 150 of the hook member 34, as will be described.

In an embodiment, the flexible cover 240 extends downwardly from a rigid portion 19 of the housing 12 towards the end hook member 34 (e.g., see FIG. 7A). Rigid portion 19 may represent a part of the outer wall of the housing 12. The rigid portion 19 may be provided in addition to, or alternative to, the top surface 13 of the opening. In one embodiment, the rigid portion 19 itself comprises the top surface 13 of the opening. That is, a separate top surface 13 as shown in FIG. 7A, that extends further into the housing need not be provided. The depiction of FIG. 7A is exaggerated, with some parts removed, to show further details of the opening 22, an upper portion 230 of the opening, a mouth 25 of the opening, the flexible cover 240 and the end hook member 34 in a first position. The flexible cover 240 may be considered part of the housing, or a separate component or set of components attached to the housing. The cover 240 extends a length or distance D downwardly from a top of the upper portion 230 of the opening 22 towards the end hook member 34, as shown in FIG. 7, for example. In an embodiment, the cover 240 covers approximately ½ of the upper portion 230 (e.g., the top half). In another embodiment, the flexible cover 240 extends over (covers) less than ½ of the upper portion 230. In another embodiment, the flexible cover 240 extends over a majority (more than ½) of the height of the upper portion 230 of the opening 22. That is, in one embodiment, the length or distance D of the flexible cover 240 that covers the opening 22 is greater than half the height $H_T$ of the upper portion 230 (D>½ $H_T$). In an embodiment, the flexible cover 240 extends over the entire upper portion 230. That is, the length or distance D of the flexible cover is about the same as or equal to the height $H_T$ of the upper portion 230 (D=$H_T$).

The upper portion of the "opening" into the housing (e.g., upper portion 230) as referred to herein includes the volume of space occupied by the flexible cover 240 itself, and (at least in some embodiments) will also include a volume of space behind the flexible cover 240—or "cover receiving void" 231—into which the flexible cover 240 may be flexed or displaced. In an embodiment, the cover receiving void 231 is also configured to receive at least a part of an attachment assembly 250 (if provided) upon its displacement (e.g., via force on end hook member 34 itself or the attachment assembly 250 itself). The upper portion 230 has a height dimension $H_T$, as seen in FIG. 7 and FIG. 7A, for example. The cover receiving void 231 has a height dimension that is equal to the length of the flexible cover (e.g., length D, extending from top surface 13 of a mouth 25 of the housing 12 to a bottom surface 243 of the flexible cover 240). A depth of the cover receiving void 231 (into the housing 12) is defined by the position in which a distal bottom surface 243 of the flexible cover 240 (the end opposite the end extending downwardly from the opening 22 and/or from the rigid portion 19 of the housing) is flexed or compressed into at least the upper portion 230 of the opening 22 when impacted by force (e.g., see flexed position in FIG. 7B). In accordance with an embodiment, the depth of the upper portion 230 of the opening 22 (and thus, the depth of the cover receiving void 231) is greater than the position in which the bottom surface 243 of the flexible cover 240 is flexed or compressed.

The "mouth" 25 of the opening 22 refers to the portion of the opening that is at the immediate entranceway into the housing 12, and can optionally also be considered to include the volume of space occupied by the flexible cover, as depicted in FIG. 7A. The "mouth" 25 of the opening does not include portions of the opening that are behind the flexible cover and behind the immediate initial rigid surface (e.g., surface 19) (if such surface is present) defining opening 22 when the cover is unflexed (or in a first or neutral position).

Figure 7B:
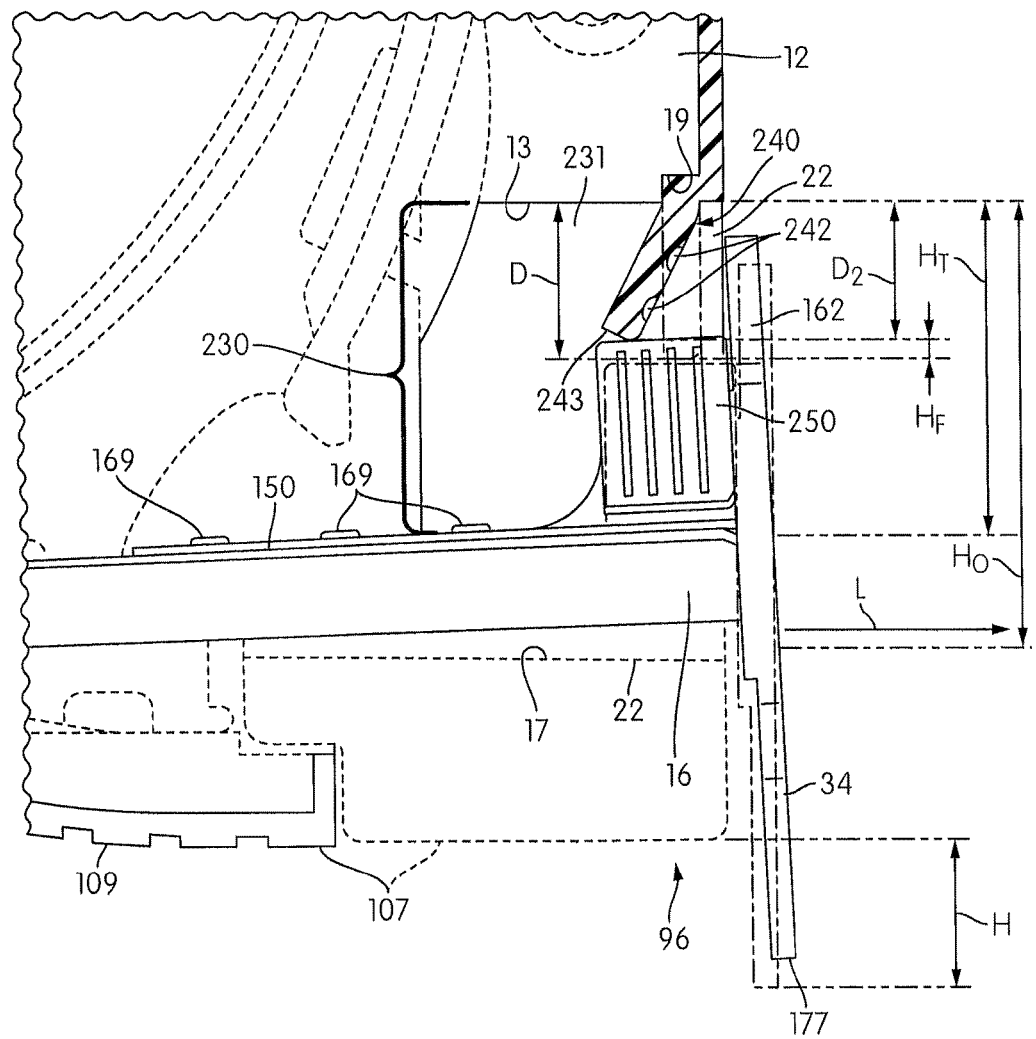
FIG. 7B is a detailed cross-sectional view of the rule assembly of FIG. 7 in a second position with some parts removed to show further details of the opening, an upper portion of the opening, a mouth of the opening, the flexible cover and the end hook member in accordance with an embodiment of the present disclosure.
Figure 9:
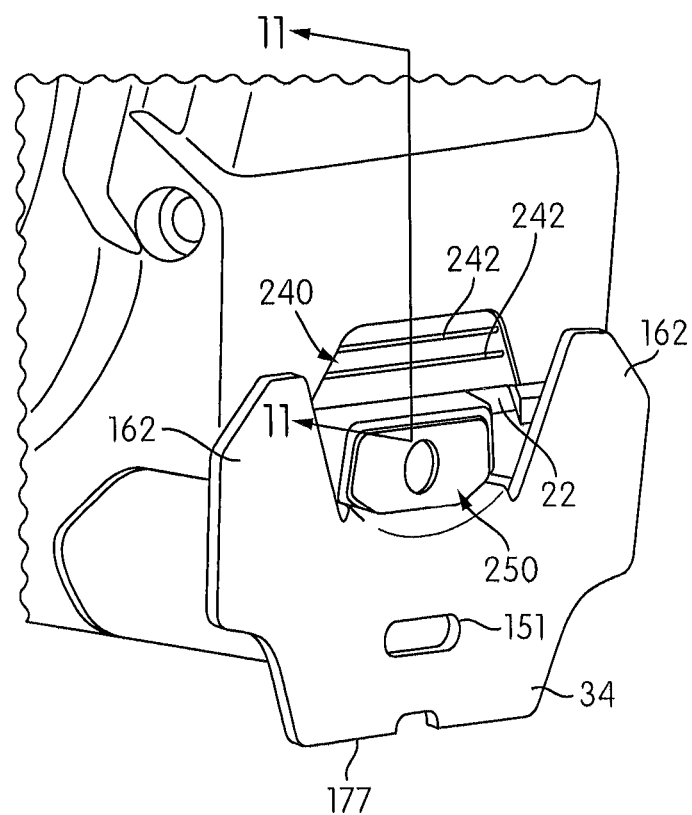
FIGS. 9 and 10 are detailed perspective and side views of the rule assembly as shown in FIG. 8.
Figure 10:
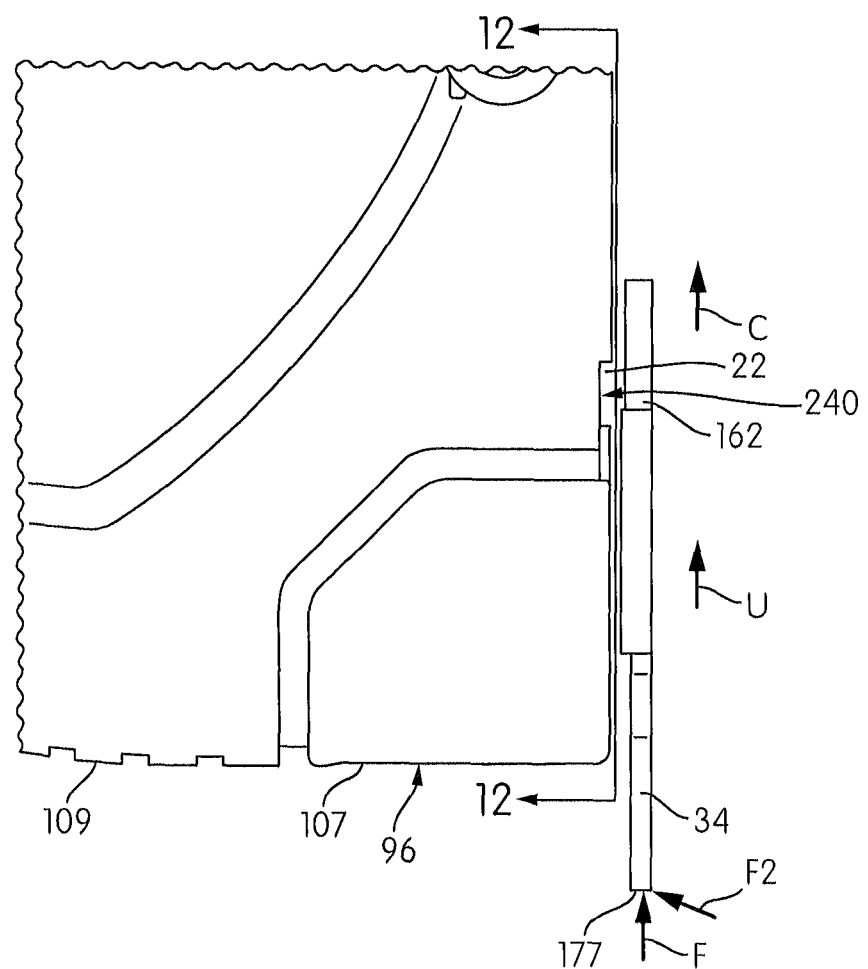
Figure 11:
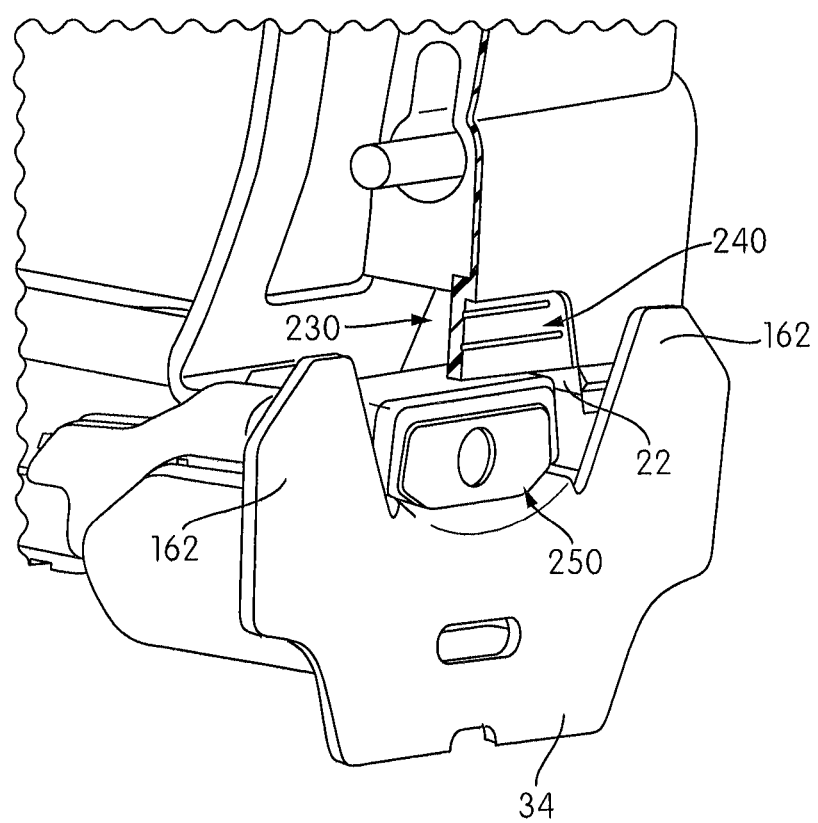
FIGS. 11 and 12 are cross-sectional views of the tape rule assembly taken through the line 11-11 in FIG. 9 and line 12-12 in FIG. 10, respectively, in accordance with an embodiment of the present disclosure.
Figure 12:
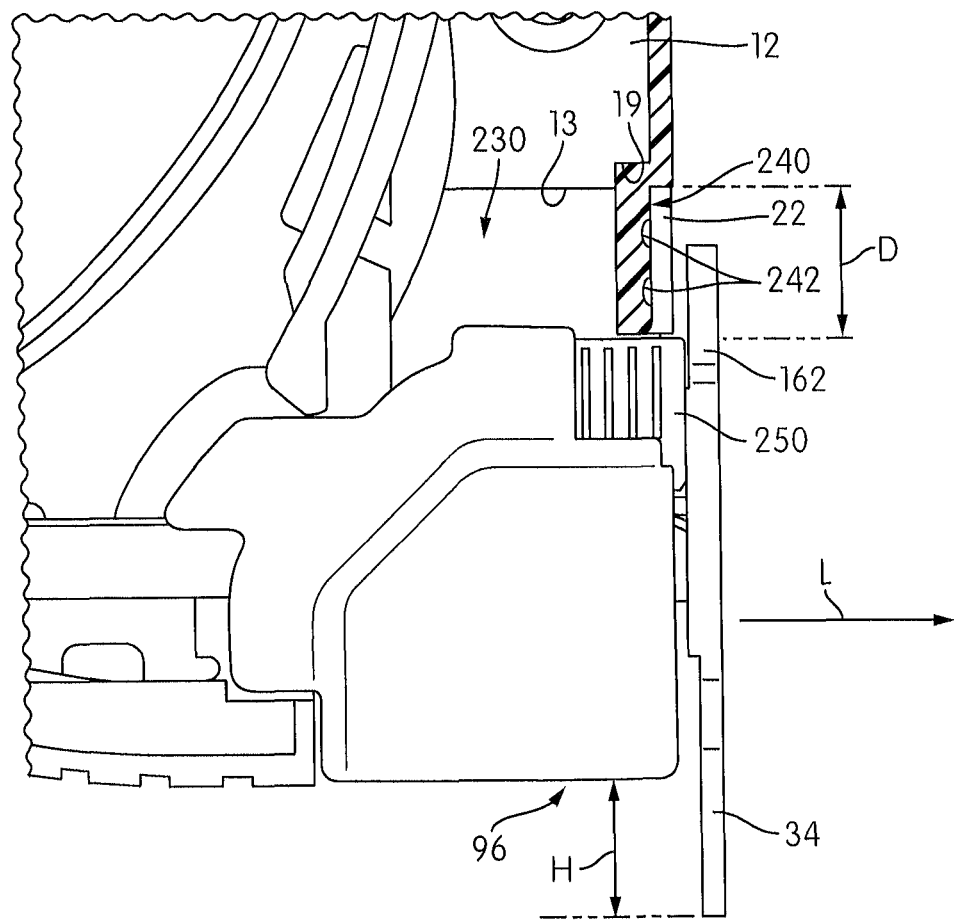

Further, as shown in FIGS. 7A and 7B, the flexible cover 240 has a front surface that appears to include a recess. For example, as seen in FIG. 9, the flexible cover 240 may, in one embodiment, be slightly recessed into the housing 12 and/or relative to the exterior wall (e.g., recessed relative to a grip portion 110). However, it should be noted that the flexible cover 240 need not include any recess therein. Instead, as represented in FIG. 1, for example, the flexible cover 240 may extend straight down relative to the housing 12 and/or be incorporated into the tape assembly 10 (e.g., into the grip portion 110 or housing 12). Further, the flexible cover 240 need not be aligned on or secured to the rigid portion 19 of the housing 12.

In an embodiment, the hook portion 152 (e.g., via its spaced leg sections 162) is configured to always engage or contact the flexible cover 240 when the blade 16 is in the fully retracted position. In another embodiment, the hook portion 152 does not contact the flexible cover 240 when the blade 16 is in the fully retracted position.

A gap may be provided between the top surface of the elongated blade 16 and the flexible cover 240. As shown in FIG. 7, the gap has a height $H_G$.

In an embodiment, the height H of the hook portion 152 extending below the bottom surface 109 of the housing 12 is less than the height $H_T$ of the upper portion 230 (H<$H_T$). In an embodiment, the height H of the hook portion 152 extending below the bottom surface 109 of the housing 12 is substantially equal to or equal to the height $H_G$ of the gap (H=$H_G$). In an embodiment, the height H of the hook portion 152 extending below the bottom surface 109 of the housing 12 is greater than the height $H_G$ of the gap (H>$H_G$). In an embodiment, the height H of the hook portion 152 extending below the bottom surface 109 is less than the height $H_G$ of the gap (H<$H_G$).

The flexible cover 240 may include ridges 242 or ribs therein to facilitate, aid, and/or enable the flexion of the body of the flexible cover 240 in at least substantially vertical direction when force is applied thereto. These ridges 242 or ribs may be molded, machined, or added, for example, in or to the flexible cover 240.

In an embodiment, the flexible cover 240 is configured to compress, bend, fold, and/or collapse when impacted. The flexible cover 240 may include a compressible material. The flexible cover 240 may also and/or alternatively be shaped or formed in a manner and/or include a geometry and/or material (e.g., foam, rubber, elastomer) that is compressible such that it is configured to compress upon application of a force F and/or F2.

In an embodiment, the flexible cover 240 is formed from a resilient material. The flexible cover 240 may also and/or alternatively be shaped or formed in a manner and/or include a geometry that is resilient, such that it is configured to return to its original shape after flexion and/or application of a force F and/or F2. The ridges 242 or ribs may assist in the resiliency of the flexible cover in that it may add rigidity to the flexible cover to assist in the cover's return to its original position and shape, and/or to ensure that an impact does not cause permanent deformation or damage to the flexible cover 240.

In one embodiment, the cover 240 may be formed from an elastic material or elastomeric material. In an embodiment, the cover 240 is made from a rubber or a rubber-like polymeric material. In an embodiment, the cover 240 is made from TPU or TPE (Thermo Plastic Elastomer). In an embodiment, the cover 24 is formed of a material that is relatively softer and/or relatively more compliant and flexible than the material used to form the main structural component of the outer housing 12. In one embodiment, the cover 240 is integrally formed as part of the grip cover 110 or coating (e.g., made of elastomeric material) on the housing 12 and acts as a hinge for flexion of the flexible cover. Just one example of such an embodiment is described later with respect to FIG. 18.

Figure 8:
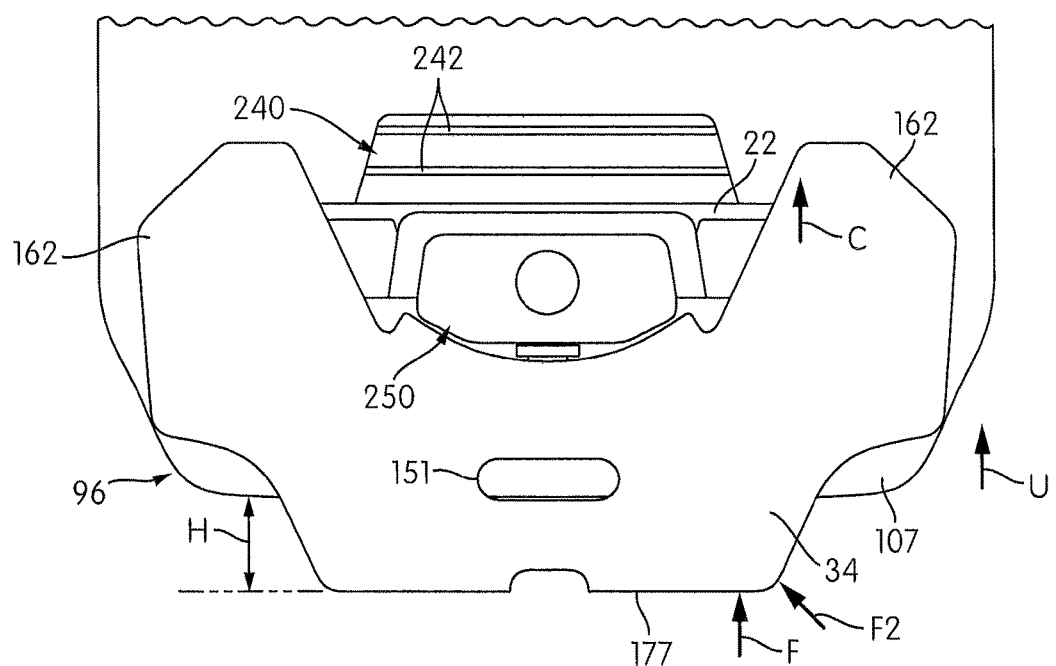
FIG. 8 is a detailed front view of the opening and end hook member of the rule assembly in a first position in accordance with an embodiment of the present disclosure.

Under normal operation, the cover 240 hides at least the upper portion 230 of the opening 22. For example, FIG. 8 shows the end hook member 34 in a first position, or an unflexed or uncompressed position, wherein the rule assembly 10 is configured for normal operation, with the blade 16 fully retracted, and the flexible cover 240 is fully extended at its distance D. As shown in detail in FIGS. 9-12, when the elongated blade 16 is in a fully retracted position, the mounting portion 150 of the end hook member 34 is received in the opening 22, the hook portion 152 extends downwardly below a bottom surface 109 or exterior portion 107 of the housing 12, and the flexible cover 240 at least overhangs or covers at least a portion of the upper portion 230 of the opening 22 to hide at least the upper portion 230 and inhibit entry of debris into the opening 22.

The flexible cover 240 is positioned to absorb force from upward impact onto the hook and permit movement of portions of the end hook member 34 (e.g., mounting portion 150) into the upper portion 230 (and, in some instances, movement of an attachment assembly 250 into the upper portion 230 (and/or void 231)). For example, as noted in FIGS. 8 and 10, when an impact force—e.g., such as a substantially upward force as noted by arrow F or an angular force as noted by arrow F2—is applied to a bottom edge 177 of the end hook member 34, the end hook member 34 is moved substantially upwardly relative to the opening 22 of the housing 12, e.g., substantially in a direction as indicated by arrow U or angular direction relative to the housing (not shown). During impact, then, as the end hook member 34 is moved, it in turn impacts or moves the flexible cover 240. The cover 240 is flexed in a direction C (e.g., flexed, collapsed, moved, pivoted, displaced, and/or compressed substantially vertically, or substantially laterally, or substantially angularly, relative to the longitudinal direction L for pulling the blade 16 from the housing 12). Movement of the end hook member 34 into the upper portion 230 aids in reducing or preventing deformation of the end hook member 34.

Figure 13:
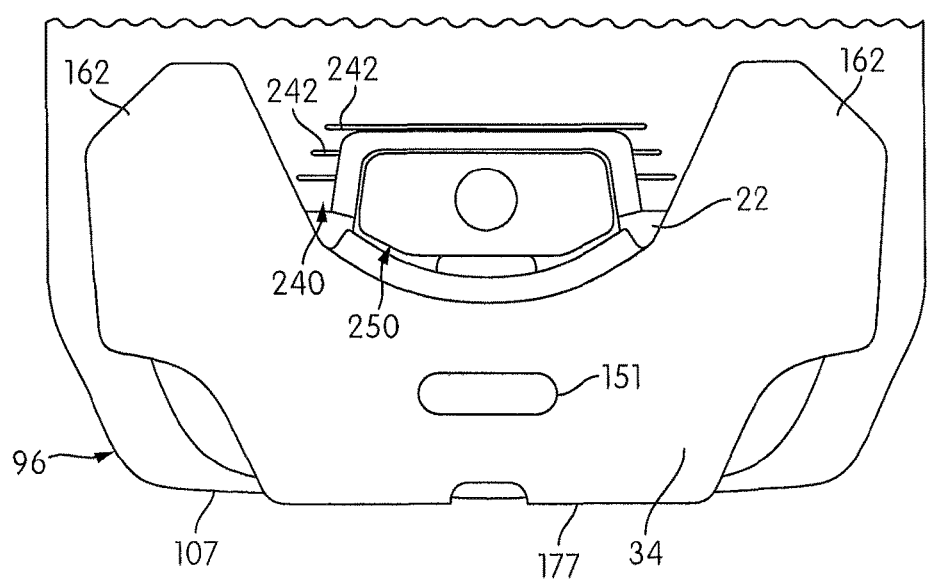
FIG. 13 is a detailed front view of the opening and end hook member of the rule assembly in a second position in accordance with an embodiment of the present disclosure.
Figure 13A:
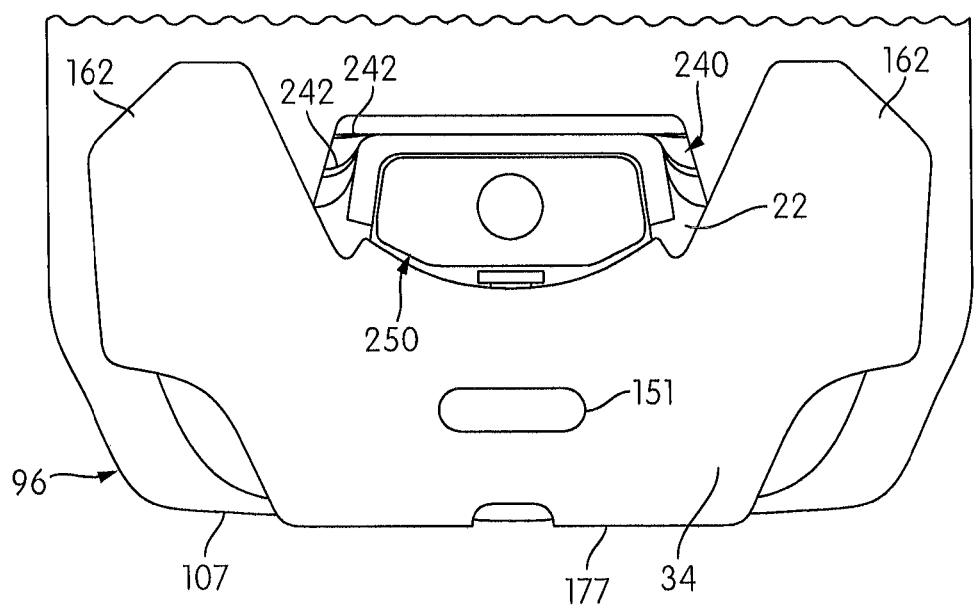
FIG. 13A is a detailed front view of the opening and end hook member of the rule assembly in a second position in accordance with another embodiment of the present disclosure.
Figure 14:
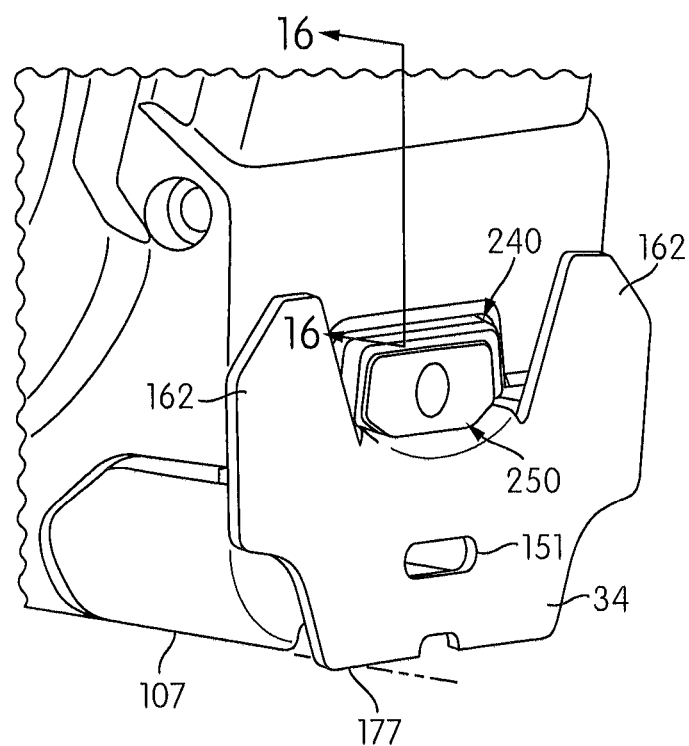
FIGS. 14 and 15 are detailed perspective and side views of the rule assembly as shown in FIG. 13.
Figure 15:
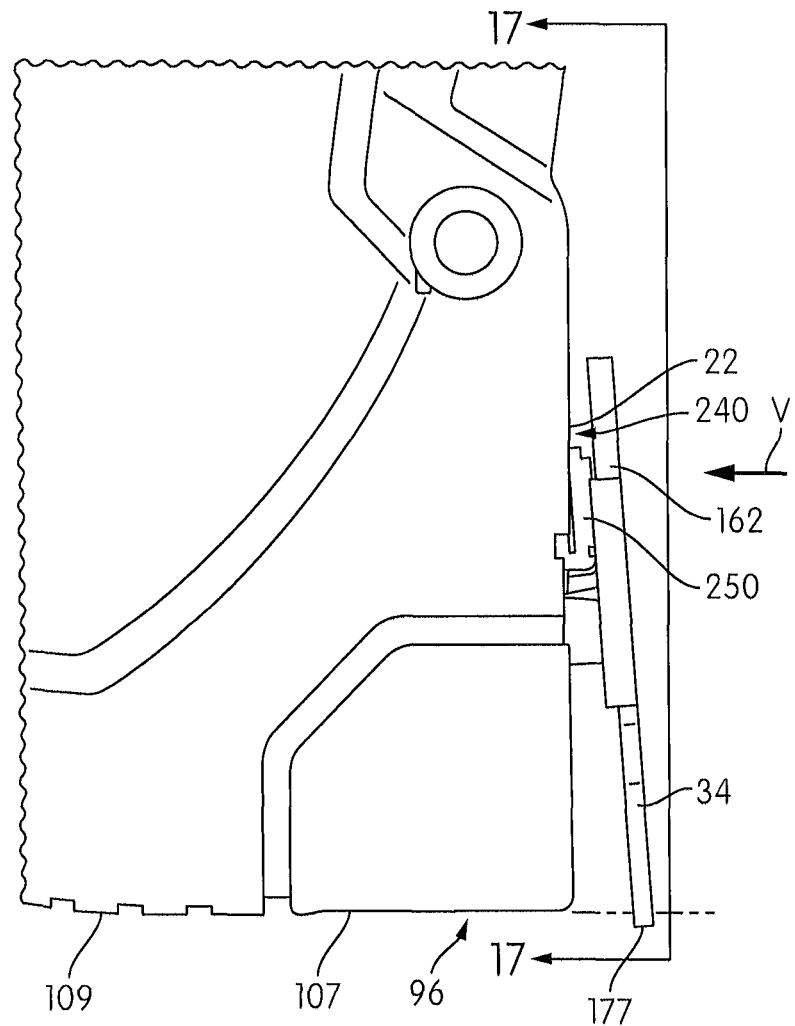
Figure 16:
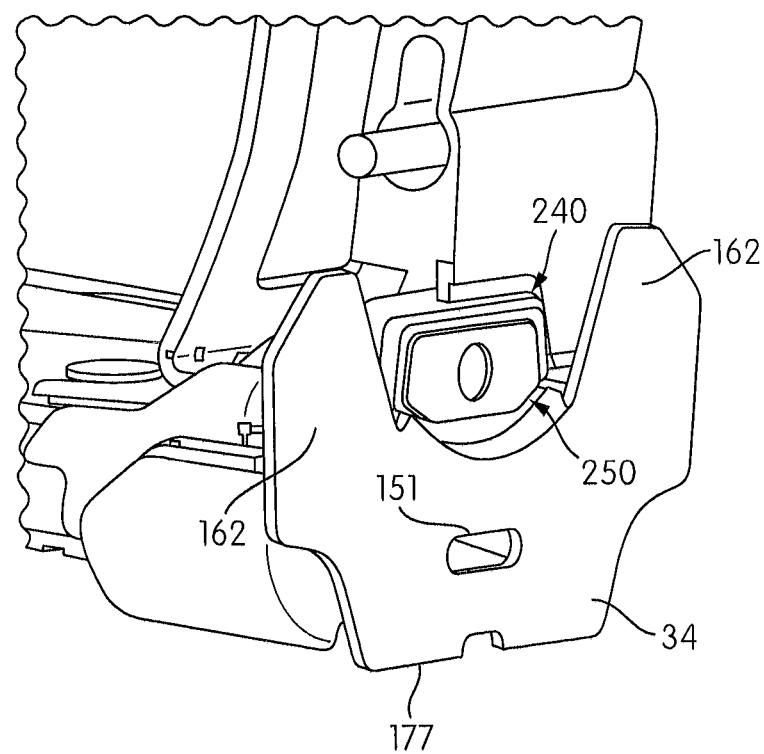
FIGS. 16 and 17 are cross-sectional views of the tape rule assembly taken through the line 16-16 in FIG. 14 and line 17-17 in FIG. 15, respectively, in accordance with an embodiment of the present disclosure.
Figure 17:
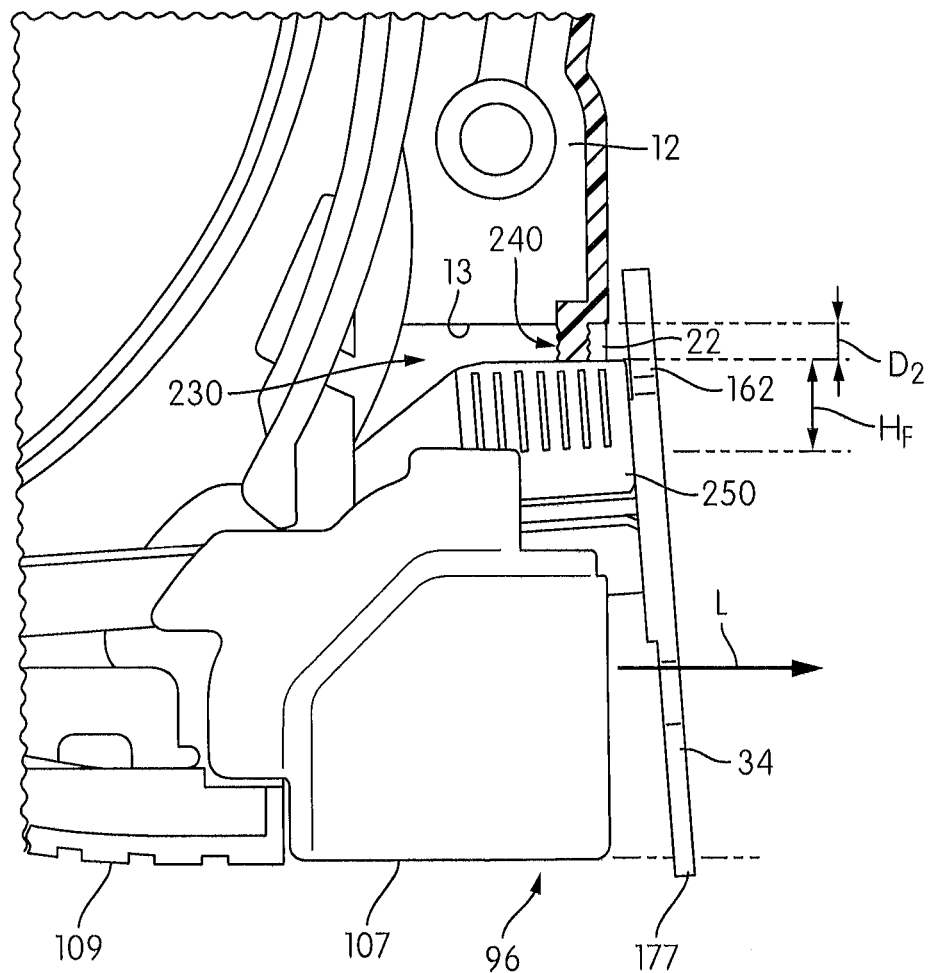
Figure 21A:
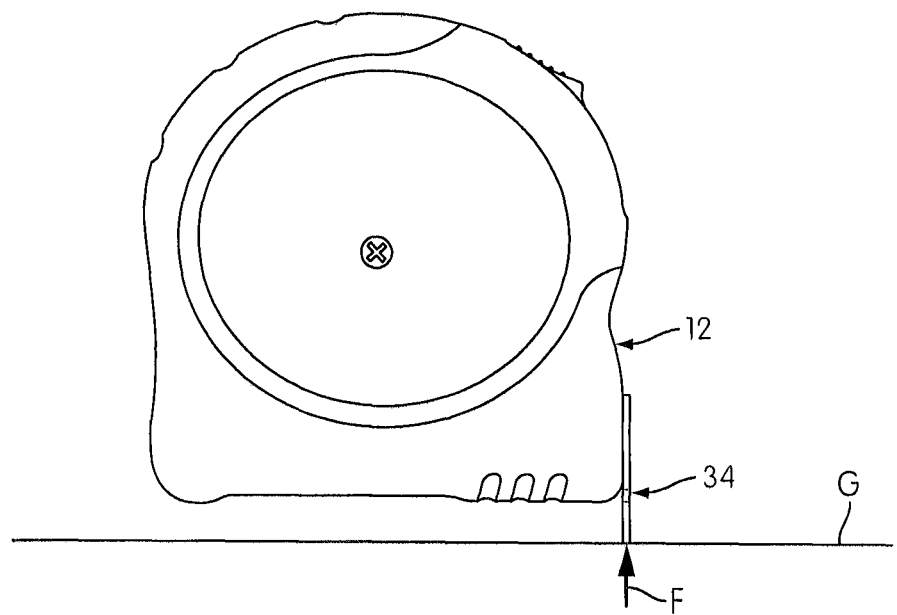
FIGS. 21A and 21B each show examples of a side elevational view of a rule assembly when impacted by a force.
Figure 21B:
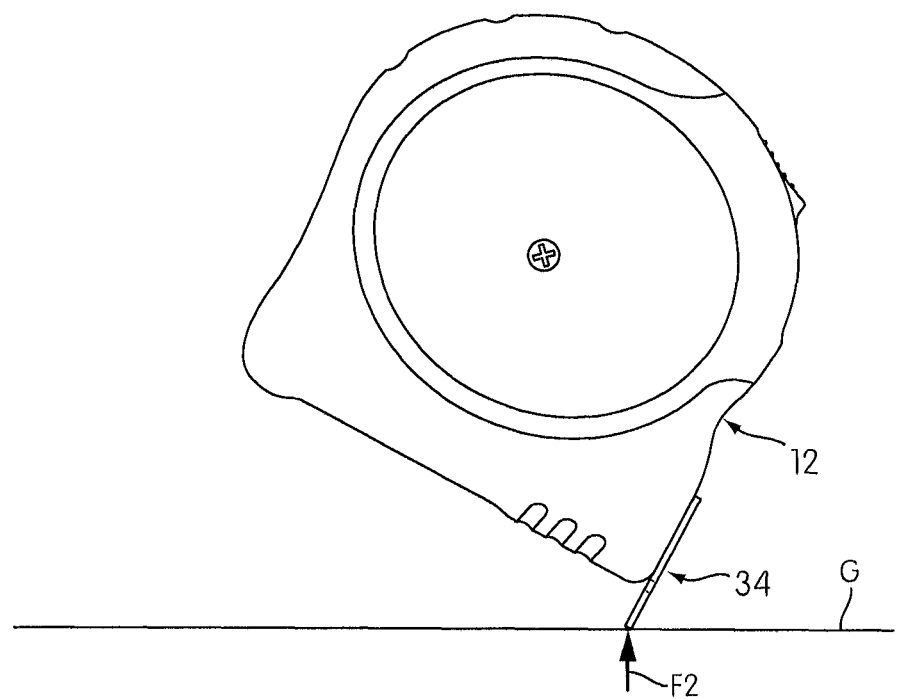

It can be appreciated from FIG. 7 that in an exemplary embodiment of the tape assembly 10, the upper portion 230 of the opening 22 is disposed generally above the mounting portion 150 of the hook member 34 when the hook member 34 is at the opening 22. The upper portion 230 and cover 240 are provided in and on the housing 12, respectively, so that if the end hook member 34 is caused to move substantially upwardly in the opening 22 and into the upper portion 230 because of an impact (e.g., by application of a force F or force F2, in a substantially upward direction U or angular direction relative to the housing 12, respectively, onto a bottom edge 177 of the end hook member 34, such as when dropped on a floor or ground G as shown in FIGS. 21A and 21B), the hook member 34 is free to move to a second position (where the blade 16 is flexed), as shown in FIG. 13 or FIG. 13A, towards and/or into cover receiving void (see FIG. 7A) and not stopped in the mouth 25 of the opening 22. The bottom edge 177 can move substantially upwardly to a position substantially in line with (or flush with) the bottom end surface or portion 107 of the housing 12. In an embodiment the flexible cover 240 is compressed by the end hook member 34, as shown in FIGS. 15 and 17. The cover 240 may be flexed or compressed to a length or distance D2 from a top of the upper portion 230 of the opening 22 towards the end hook member 34, as shown in FIG. 7B or FIG. 17, for example. The flexion and/or compression of the flexible cover 240 reduces the force that is applied to the end hook member 34 and allows it to recess into the upper portion 230.

In an embodiment, the elongated blade and end hook member are at least partially in the upper portion 230 in the second position upon or after substantially upward impact by force on a bottom edge 177 of the hook portion 152. In an embodiment, the hook portion 152 is at least partially in the upper portion 230 in the second position. In an embodiment, the cover 240 is flexed or moved at least partially into the upper portion 230 in the second position upon or after impact by force, such that the hook may enter the upper portion 230.

As shown in FIG. 4 and FIG. 7, the height dimension $H_O$ of the opening 22 may be measured from the top surface 13 of the structural rigid portion of the housing 12 (at the opening 22) to the bottom surface 17 (at the opening 22) of the structural rigid portion of the housing 12. In one embodiment, to accommodate movement of the end hook member 34 into the upper portion 230, the height $H_T$ of the upper portion 230 extending above the hook portion between the structural rigid portion of the housing 12 and the top of the elongated blade 16 exceeds a height dimension H of a portion of the hook portion 152 that extends downwardly below the bottom surface 109 or portion 107 of the housing 12. The upper portion 230 is of a height $H_T$ to operatively accommodate the movement of the at least a portion of the end hook member 34 therein. For example, the upper portion 230 may be sized to accommodate movement of at least the mounting portion 150 therein. The height $H_T$ of the upper portion 230 is provided to substantially prevent possible damage to the end hook member 34 when the blade 16 is fully retracted and the end hook member 34 is impacted (by dropping or the like) in a direction (arrow U) that tends to move the end hook member 34 substantially upwardly with respect to the opening 22.

In one embodiment, the end hook member 34 initially contacts the flexible cover 240 prior to the bottom 177 of the hook portion 34 being at the height of the bottom surface 109 of the housing 12. The flexible cover 240 flexes sufficiently to enable the bottom 177 of the end hook member 34 to reach the height of the bottom surface 109 of the housing 12. In one embodiment, the flexible cover 240 flexes, collapses, moves, compresses, pivots, and/or displaces upwardly by at least ⅛" to accommodate the upward blade and/or hook movement. In another embodiment, the cover 240 has sufficient compressibility and/or flexibility to be moved or displaced between ⅛" and ½". In another embodiment, such movement or displacement is at least ¼". As noted later, the displacement of the flexible cover 240 by at least ⅛" refers to a height difference between a bottom surface 243 of the flexible cover 240 in a first position and the bottom surface 243 of the flexible cover 240 when in the second position upon impact by force.

Figure 18:
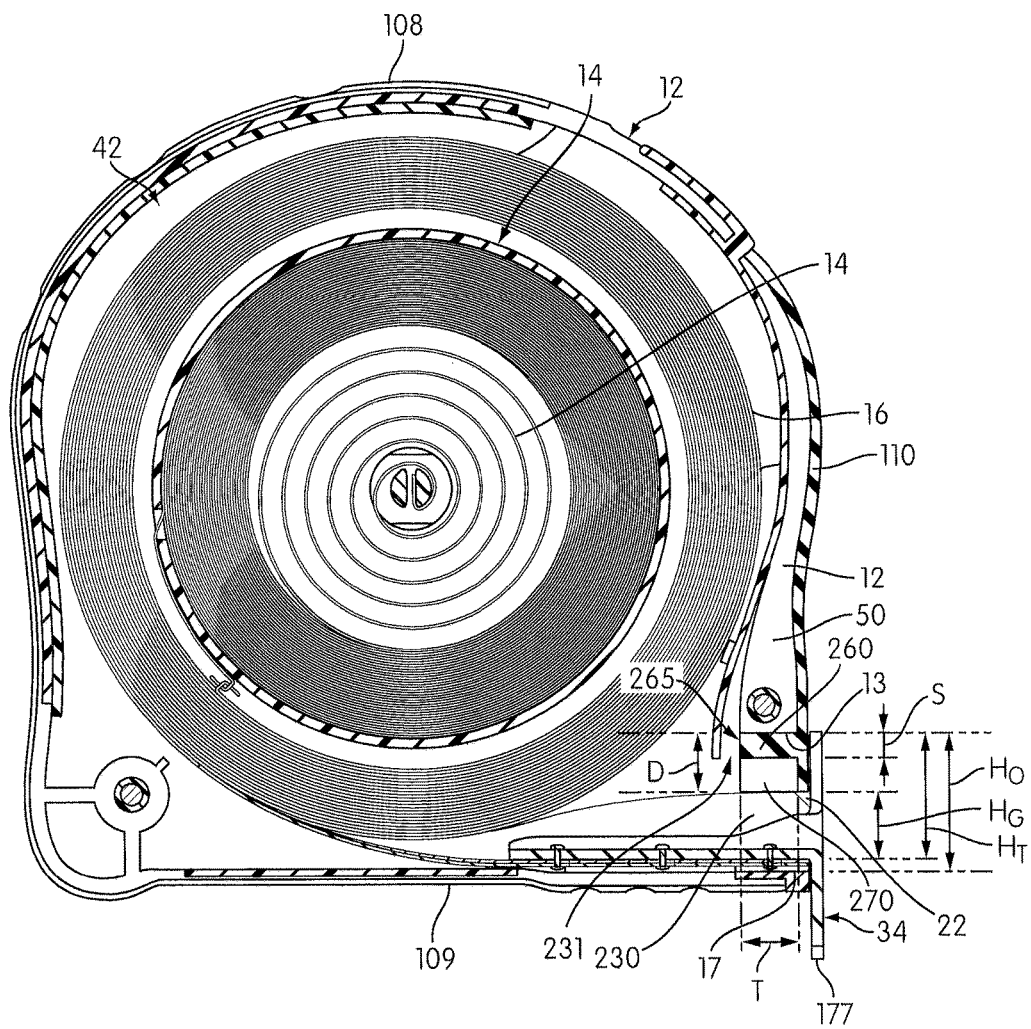
FIG. 18 shows a cross-sectional view of the tape rule assembly showing a blade thereof in a fully retracted configuration in accordance with another embodiment of the present disclosure.

FIG. 18 shows a cross-sectional view of the tape rule assembly showing a blade thereof in a fully retracted configuration in accordance with another embodiment of the present disclosure. The housing 12 has a flexible cover portion 265 that is received and disposed in the upper portion 230 of opening 22, below top surface 13 of housing 12 and above the elongated blade 16 and the mounting portion 150 when the elongated blade 16 is in the fully retracted position. The flexible cover portion 265 includes a resilient hinge 260 and a rigid structure 270. The resilient hinge 260 acts as a hinge or flexible member that allows movement of the rigid structure 270 of the cover portion 265 relative to the opening 22 and housing 12. That is, the resilient hinge 260 flexes, collapses, moves, compresses, pivots, and/or displaces such that the rigid structure 270 is moved or displaced. Accordingly, should the end hook member 34 be impacted by force, and thus moved into contact with the rigid structure 270, the rigid structure 270 may be moved relative to the housing 12 (e.g., in a substantially upward and/or rearward direction (into the housing 12), such as previously described with reference to arrow U and the Figures above) by transfer of force through the rigid structure 270 to flex the resilient hinge 260, which absorbs the applied force from the impact. In an embodiment, the rigid structure 270 is moved or displaced further into, or rearwardly within, the upper portion 230 of the opening 22, and, more specifically, into the cover receiving void 231 in the housing 12 (as shown in FIG. 7A, for example).

In one embodiment, the resilient hinge 260 is part of the grip cover 110, as shown in FIG. 18. The resilient hinge 260 may be integrally formed as part of the grip cover 110 or coating (e.g., made of elastomeric material) on the housing 12, or attached thereto. For example, a peripheral portion of housing 12 may be provided with a grip cover 110 or coating thereon (e.g., such as previously described above). The grip cover 110 or coating may be made of elastomeric material, e.g., rubber or a rubber-like polymeric material or TPU or TPE (Thermo Plastic Elastomer), that is overmolded onto the housing 12, and provided in any number of locations on the housing, such as around the portion of the housing 12 to be gripped during use and/or near the opening 22 of the tape rule assembly 10. The resilient hinge 260 may be made of similar or the same elastomeric material, e.g., rubber or a rubber-like polymeric material or TPU (Thermoplastic Polyurethane) or TPE (Thermo Plastic Elastomer). The resilient hinge 260 may be formed integrally with the grip cover 110 or formed separately.

In one embodiment, the resilient hinge 260 has a length or thickness S, as shown in FIG. 18, in the vertical direction. The rigid structure 270 can be sized to have a width or thickness T, as shown in FIG. 18, in the horizontal direction. In one embodiment, the housing 12 includes an opening or area (e.g., hole) for receipt of the resilient hinge 260 therein. In one embodiment, the opening or area on the housing 12 is dimensioned to be similar or substantially equal to the resilient hinge 260. For example, the length or thickness of the opening or area in a vertical direction may be substantially equal to length S of the resilient hinge 260, such that the resilient hinge 260 can be press fit therein. The resilient hinge 260 is configured to flex, collapse, move, pivot, displace, and/or compress when the rigid structure 270 is moved or displaced (by force) by the end hook member 34 (with or without attachment assembly 250) and/or adjacent portions of the blade 16. The width or thickness T of the rigid structure 270 may be based on a length that the resilient hinge 260 extends (in a horizontal direction) into the housing 12, or vice versa (i.e., the length of the resilient hinge 260 in the horizontal direction into the housing is based on the thickness T of the rigid structure 270).

In an embodiment, the housing 12 and the rigid structure 270 are formed of similar or the same materials. In one embodiment, the housing 12 and the rigid structure 270 are formed from an Acrylonitrile Butadiene Styrene (ABS) plastic. In an embodiment, the resilient hinge 260 is formed from TPE or TPU or a resilient material. Of course, other materials, such as polycarbonates and/or combinations of materials, may also be used to form the housing 12 and rigid structure 270 of the flexible cover portion 265.

In one embodiment, the grip cover 110 and the resilient hinge 260 are formed from TPE or TPU or a resilient material.

In an alternate embodiment, the resilient hinge 260 provided between the housing 12 and the rigid structure 270 may take the form of a metal spring.

Of course it should be noted that the resilient hinge 260 and rigid structure 270 of the flexible cover portion 265 are not intended to be limited to the shape, configuration, dimensions, and/or materials shown in the Figure and noted above.

Figure 19:
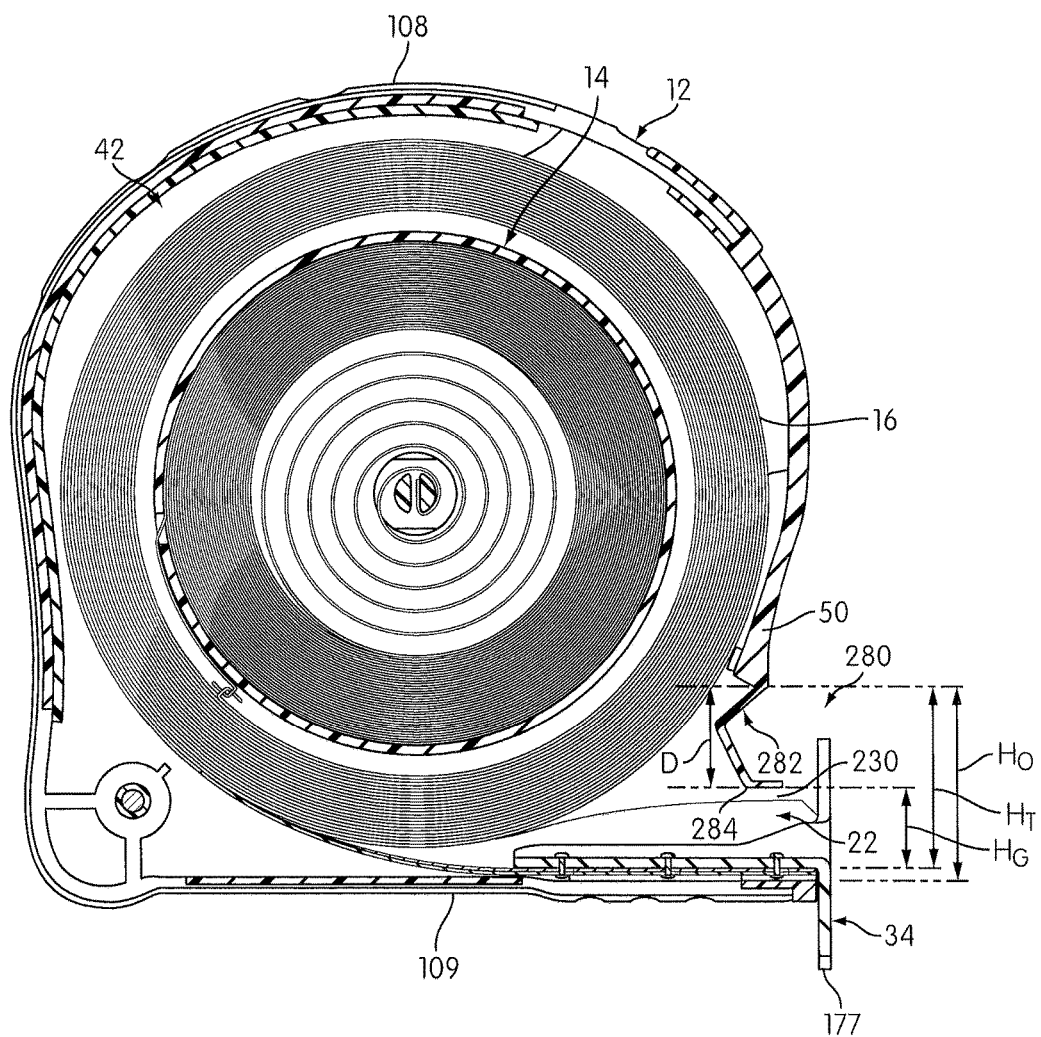
FIG. 19 shows a cross-sectional view of the tape rule showing a blade thereof in a fully retracted configuration in accordance with yet another embodiment of the present disclosure.

FIG. 19 illustrates yet another embodiment of the tape rule assembly 10 having a flexible cover 280. As shown, the flexible cover 280 is formed as part of a peripheral wall 50 of the housing 12. In an embodiment, the body 282 of the flexible cover 280 is formed of similar or the same material as the housing 12. The flexible cover 280 includes a body 282 that extends into an upper portion 230 of the opening 22 and rearwardly within the housing 12. The flexible cover 280 may also include a contact portion 284 for contact or impact by the end hook member 34 or an attachment assembly 250 (if included thereon) when the end hook member 34/attachment assembly 250 is moved or forced into contact with the flexible cover 280. The contact portion 284 may be a part of the body 282, e.g., integrally formed therewith, or attached to the body 282. In an embodiment, as shown in FIG. 19, the contact portion 284 may extend in a substantially horizontal direction relative to the blade 16 and/or the mounting portion 150 of the end hook member 34. The contact portion 284 is provided within the opening 22 of the housing 12. In an embodiment, the body 282 of flexible cover 280 covers a majority (more than ½) of the height of the upper portion 230 of the opening 22.

In an embodiment, the body 282 of the flexible cover has a geometry such that it can move or bend upon impact (e.g., via contact with end hook member 34 or blade 16). In an embodiment, at least the body 282 of the flexible cover 280 is resilient and configured to return to its original shape. For example, at least the body 282 may be formed from a resilient material. The body 282 may be formed or shaped into a resilient structure and/or include a geometry that is resilient, such that it is configured to return to its original shape after flexion and/or application of a force F and/or F2. For example, the body 282 may be formed into a resilient U-shape, V-shape, W-shape, S-shape, or other shape that facilitates flexion. The body 282 of the flexible cover 280 extends from and/or is connected to the housing 12 near or at the top surface 13 via a living hinge 281, in accordance with one embodiment. The living hinge 281 allows for flexing of the body 282 relative to the top surface 13 of the housing 12 when force is applied to the flexible cover 280. In an embodiment, as shown in FIG. 19, the body 282 is "V"-shaped and allows for flexing or movement when force applied to the contact portion 284 of the flexible cover 280. Accordingly, the V-shape of the body 282 can flex when force is applied to the flexible cover 280 and absorb or dampen the impact.

Figure 19A:
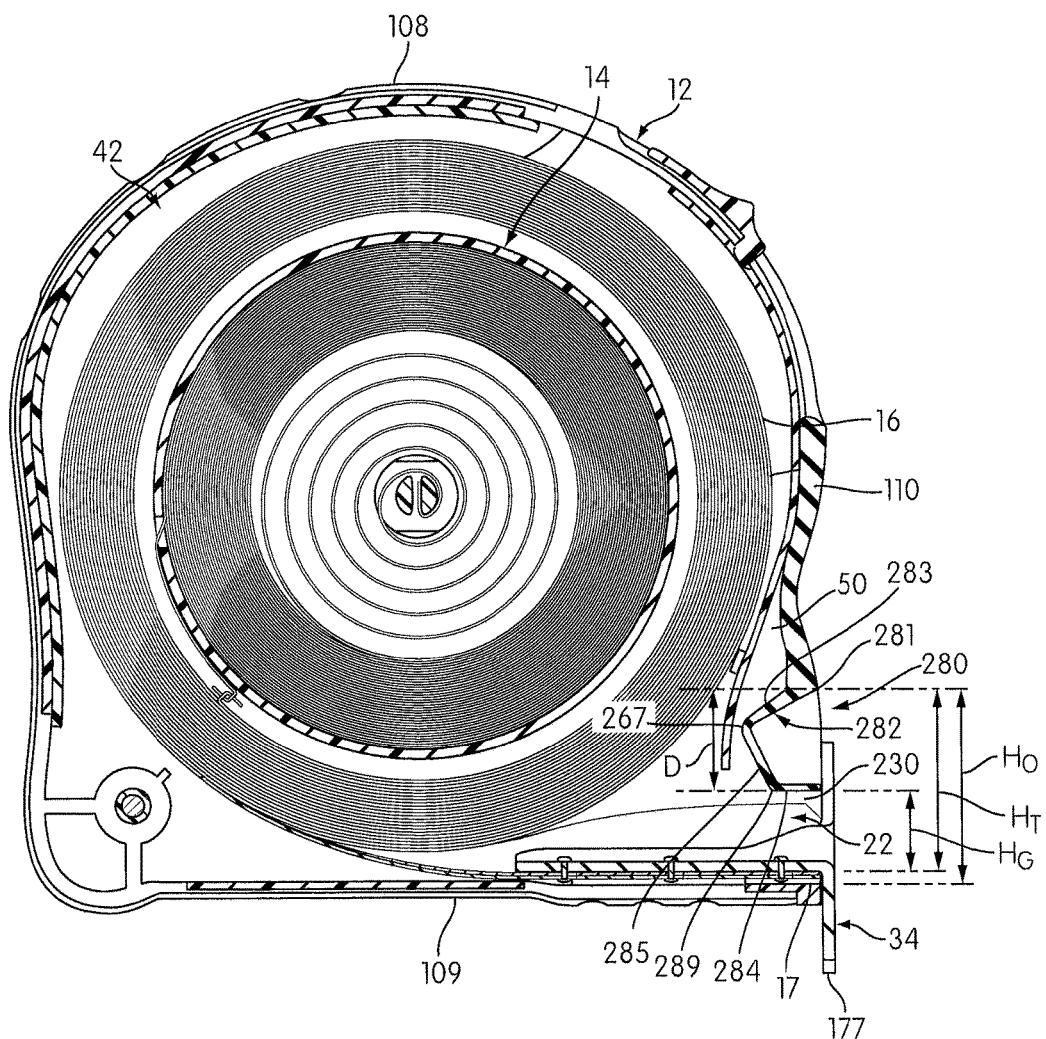
FIG. 19A shows a cross-sectional view of the tape rule showing a blade thereof in a fully retracted configuration in accordance with yet another embodiment of the present disclosure.

In an embodiment, the body 282 of the flexible cover 280 may be formed of similar or the same material as the grip cover 110, for example, as shown in FIG. 19A. Similar reference numbers are used in FIG. 19A as in FIG. 19 to reference similar parts. The flexible cover 280 includes a body 282 that extends into an upper portion 230 of the opening 22 and rearwardly within the housing 12. The flexible cover 280 may also include a contact portion 284 for contact or impact by the end hook member 34 or an attachment assembly 250 (if included thereon) when the end hook member 34/attachment assembly 250 is moved or forced into contact with the flexible cover 280. The contact portion 284 may be a part of the body 282, e.g., integrally formed therewith, or attached to the body 282. In an embodiment, as shown in FIG. 19A, the contact portion 284 may extend in a substantially horizontal direction relative to the blade 16 and/or the mounting portion 150 of the end hook member 34. The contact portion 284 is provided within the opening 22 of the housing 12. In an embodiment, the body 282 of flexible cover 280 covers a majority (more than ½) of the height of the upper portion 230 of the opening 22.

In an embodiment, the body 282 of the flexible cover in FIG. 19A has a geometry such that it can move or bend upon impact (e.g., via contact with end hook member 34 or blade 16). In an embodiment, at least the body 282 of the flexible cover 280 is resilient and configured to return to its original shape. For example, at least the body 282 may be formed from a resilient material. The body 282 may be formed or shaped into a resilient structure and/or include a geometry that is resilient, such that it is configured to return to its original shape after flexion and/or application of a force F and/or F2. For example, the body 282 may be formed into a resilient U-shape, V-shape, W-shape, S-shape, or other shape that facilitates flexion. The body 282 of the flexible cover 280 is connected to the housing 12 near or at the top surface 13 via a living hinge 281, in accordance with one embodiment. The living hinge 281 allows for flexing of the body 282 relative to the top surface 13 of the housing 12 when force is applied to the flexible cover 280. In an embodiment, as shown in FIG. 19A, the body 282 is "V"-shaped and includes a first portion 283 and a second portion 285. In on embodiment, the first and second portions 283, 285 are connected by a living hinge 287. The living hinge 287 allows for flexing or movement of the second portion 285 relative to the first portion 283 when force applied to the flexible cover 280. In an embodiment, the second portion 285 is configured to move the first portion 283. For example, the second portion 285 may bend or move upwardly relative to the first portion 283 (and housing 12) via the living hinge 287 as well as force or move the first portion 283 of the body 282 relative to the housing 12 via living hinge 281 when force is applied to the flexible cover 280. Accordingly, the V-shape of portions 283, 285 of the body 282 can flex when force is applied to the flexible cover 280 and absorb or dampen the impact. In one embodiment, the contact portion 284 is connected to the second portion 285 of the body via a living hinge 289. The living hinge 289 allows for flexing of the contact portion 284 when force is applied to the flexible cover 280.

In an embodiment, the contact portion 284 may be formed of similar or the same material(s) as the grip cover 110 or housing 12. In one embodiment, the contact portion 284 is formed from a different material than the body 282 of the flexible cover 280. In an embodiment, at least the contact portion 284 of the flexible cover 280 is formed of a resilient material.

Figure 20:
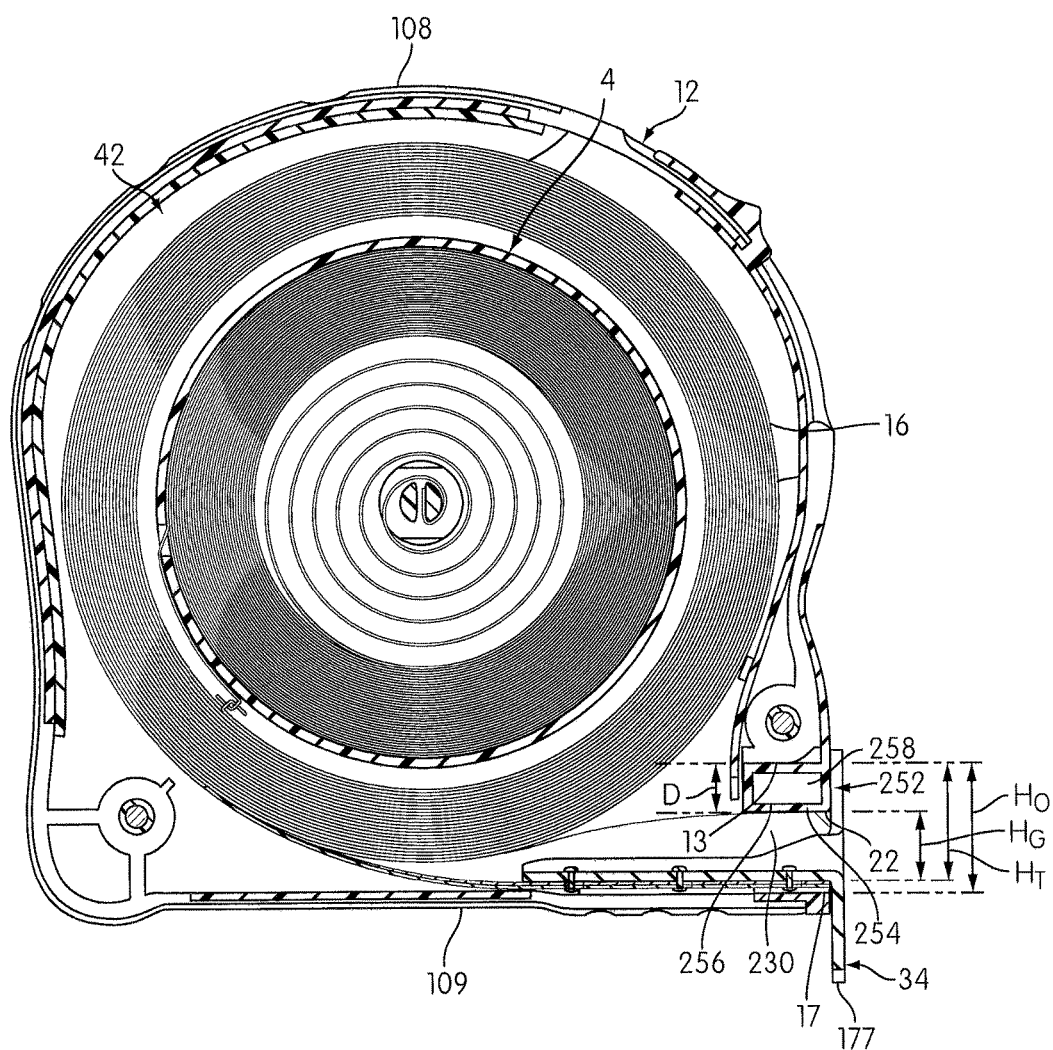
FIG. 20 shows a cross-sectional view of the tape rule assembly showing a blade thereof in a fully retracted configuration in accordance with still yet another embodiment of the present disclosure.

FIG. 20 illustrates still yet another embodiment of the tape rule assembly 10 having a flexible cover 252. The housing 12 has a flexible cover portion 252 that is received and disposed in the upper portion 230 of the opening 22, below top surface 13 of housing 12 and above the elongated blade 16 and the mounting portion 150 when the elongated blade 16 is in the fully retracted position. As shown, flexible cover 252 includes a body 254 that extends into an upper portion 230 of the opening 22 within the housing 12. In an embodiment, the body 254 of flexible cover 252 may extend into a majority of (more than ½) of the height of the upper portion 230 of the opening 22. The body 254 acts as a hinge or flexible member that moves relative to the opening 22 and housing 12. That is, the body 254 flexes, collapses, moves, compresses, pivots, and/or displaces when force is applied to the flexible cover 252. Accordingly, should the end hook member 34 be impacted by force, and thus moved into contact with the body 254, body 254 may be moved relative to the housing 12 (e.g., in a substantially upward and/or rearward direction (into the housing 12), such as previously described with reference to arrow U and the Figures above). Further, one or more parts of the body 254 may flex relative to the housing 12. For example, the body 253 may flex relative to a top surface 13 in the housing 12. In an embodiment, the body 254 is sized to contain the volume of the cover receiving void 231 of the upper portion 230 of the opening 22.

In an embodiment, the outer body 254 of the flexible cover 252 further comprises a cavity 256 therein. The cavity 256 may be a hole surrounded or encompassed on all sides by walls of the outer body 254.

In one embodiment, the cavity 256 is filled with a material 258. The material can be a gas, a gel, a liquid, or a combination thereof, for example. The outer body structure 254 of the flexible cover 252, in one embodiment, is formed by a resilient material, such as an elastomer rubber material. The flexible cover 252 may also and/or alternatively be shaped or formed in a manner and/or include a geometry that enhances its resilience, such that it is configured to return to its original shape after flexion and/or application of a force F and/or F2. The body 254 [and any material 258 within the cavity 256] may be flexed upon application of force from the end hook member 34 when the end hook member 34 is impacted by force (e.g., impacted by force F and/or F2) to absorb such force. In accordance with an embodiment, the body 254 of the flexible cover 252 may be then configured to return to its original shape after the end hook member 34 (or attachment assembly 250, or the device applying the impact) is moved out of contact with the flexible cover 252.

It should be understood that any of the dimensions previously disclosed with reference to FIGS. 7-17 may, in some embodiments, also apply to the illustrative embodiments of FIGS. 18-20. For example, in one embodiment, the housing opening 22 has a height dimension $H_O$, as defined above with reference to FIG. 4, for example. The upper portion 230 of the opening 22 in any of FIGS. 18-20 has a height dimension $H_T$, for example, that extends and is measured from the top surface 13 of the structural rigid portion of the housing 12 at the opening 22 to the bottom surface 17 of the structural rigid portion of the housing 12 at the opening 22. Any of the flexible covers 252, 265, 280 may extend a length or distance D from a top of the opening 22 (e.g., from top surface 13 of the housing 12) towards the end hook member 34. In an embodiment, the length or distance D of the flexible cover is less than the height $H_T$ of the upper portion 230 (D<$H_T$) for any of FIGS. 18-20. In an embodiment, the flexible cover 252, 265, 280 extends over or covers a majority of (covers more than half of) the height of the upper portion 230 of the opening 22. In another embodiment, the length or distance D of the flexible cover 252, 265, 280 is about the same as or equal to the height $H_T$ of the upper portion 230 (D=$H_T$). In an embodiment, the flexible cover 252, 265, 280 extends over the entire upper portion 230. To accommodate movement of the end hook member 34 into the upper portion 230 of the opening 22 in any of FIGS. 18-20, the height $H_T$ of the upper portion 230 extending above the hook portion 152, in one embodiment, exceeds a height dimension H of a portion of the hook portion 152 that extends downwardly below the bottom surface 109 or portion 107 of the housing 12, as previously described. In one embodiment, the end hook member 34 initially contacts the flexible cover 252, 265, or 280 prior to the bottom 177 of the hook portion 34 being at the height of the bottom surface 109 of the housing 12. In one embodiment, the flexible cover 252, 265, or 280 flexes sufficiently to enable the bottom 177 of the end hook member 34 to reach the height of the bottom surface 109 of the housing 12. However, in other embodiments, the bottom 177 of the hook portion 34 stops just short of the height of the bottom surface 109 of the housing, so that it projects only slightly below the housing upon impact.

In accordance with various embodiments, including any of the embodiments shown and described herein, the tape rule assembly 10 may accommodate an attachment assembly 250 removably attachable (directly or indirectly) onto the free end of the elongated blade 16, as shown in FIGS. 7-17, for example. Specifically, FIGS. 7-17 illustrate an exemplary embodiment having an attachment assembly 250 comprising a magnet that is removably attachable to the elongated blade 16 via rivets 169. The attachment assembly 250 may at least partially extend into (and may optionally be fully contained within) the upper portion of the opening 22 when the elongated blade assembly is in the fully retracted position. Also, in an embodiment, any force that is received by the end hook member 34 upon impact may be translated from the end hook member 34 to the attachment assembly 250, which in turn contacts the flexible cover to flex the flexible cover (e.g., cover 240), which flexible cover absorbs (or softens) the effect of the impact on the end hook member 34 (as well as softening the translated impact upon the housing 12). However, such embodiments are not intended to be limiting. For example, the attachment assembly 250 may be attached to the end hook member 34, in addition to, or instead of, the rivets 169, or the blade 16. The attachment assembly 250 may be applied to any of the embodiments disclosed with reference to FIGS. 18-20, for example. For illustrative and explanatory purposes only, the attachment assembly 250 and its use with a tape measure 10 is described with reference to FIGS. 7-17. Further, instead of a magnet, an attachment assembly 250 may alternately be another utility device, instrument, or tool, and thus the type of attachment is not intended to be limited to that as illustrated in the Figures. For example, the attachment or attachment assembly 250 may comprise another hook, a light, a writing instrument, and/or a device for holding a writing instrument.

In some embodiments, the utility device, instrument or tool can be in addition to the attachment assembly 250. Specifically, while the attachment assembly 250 in one embodiment is attached at the free end of the blade so as to be above the end hook mounting portion, an additional utility device, instrument or tool (such as an extended hook portion) can additionally be attached to the end portion, such as attached to the hook portion of the end hook member 34. In such embodiment, for example in addition to attachment assembly 250, a hook attachment is attached directly to the hook. In such embodiment, the impact may be translated to the end hook member 34 through the hook attachment (e.g., a magnet, pencil or additional hook extension attached to the downwardly depending portion (hook portion) of the end hook member. Further, the attachment assembly need not be configured such that it only extends above or on top of the end hook member 34 or blade 16. That is, the attachment may extend upwardly and/or downwardly relative to the free end of the blade, for example forwardly of or alongside the hook portion of the end hook member 34.

In one embodiment, the contact or impact with the ground that moves the free end of the blade 16 upwardly is indirectly translated to the blade and end hook 34 through one of the utility device(s) that can be attached to the end hook member 34. In one embodiment, the attachment, attachment assembly or utility device (that is connectable to the end hook 34 or rivets, extends downwardly below the bottom edge 177 of the hook portion 152. In an embodiment, the attachment, the utility device, or attachment assembly receives direct contact or impact with the ground. If so desired, a user may selectively remove the attachment assembly 250 from the elongated blade 16. Further, in accordance with one embodiment, the attachment assembly is centered relative to the elongated blade 16 when attached to its free end. In one embodiment, the attachment assembly 250 rests upon the upper surface of the mounting portion 150 when it is attached to the free end of the blade 16.

As shown in FIG. 7, the attachment portion 250 has a height $H_A$. In one embodiment, the height $H_A$ of the attachment portion 250 may range from 0 (zero) to the height $H_G$ of the gap. In another embodiment, the height $H_A$ of the attachment portion 250 may be larger than the height $H_G$ of the gap. In yet another embodiment, the height $H_A$ of the attachment portion 250 may be slightly less than one half of the height $H_T$ of the upper portion 230. In another embodiment, the height $H_A$ is greater than half of the height $H_T$ of the upper portion 230 of the opening 22.

In one embodiment, the height $H_T$ of the upper portion 230 is greater than the height $H_A$ of the attachment portion 250, and height $H_A$ of the attachment portion 250 is greater than the height $H_G$ of the gap ($H_T$>$H_A$>$H_G$). In another embodiment, the height $H_A$ of the attachment portion 250 is less than the height $H_G$ of the gap ($H_A$<$H_G$).

In an embodiment, the attachment portion 250 is configured to always engage or contact the flexible cover 240 when the blade 16 and end hook member 34 are in the fully retracted position. In such embodiment, the cover 240 may be flexed as a result of engagement with the attachment portion 250 whenever the blade 16 is fully retracted. In another embodiment, the attachment portion 250 is spaced below a bottom of the flexible cover 240 when the blade 16 and end hook member 34 are in the fully retracted position.

When the end hook member 34 has an attachment assembly 250 thereon and is moved substantially upwardly and/or angularly with respect to the opening 22 by an impact force (e.g., via force F or F2, e.g., when dropped on ground G) (when the elongated blade 16 is in the fully retracted position), the attachment assembly 250 flexes or compresses the flexible cover 240, from its initial length D to distance D2, such as shown in FIG. 17, for example, and the upper portion 230 accommodates at least a portion of the attachment assembly 250 therein. Accordingly, any damage to the magnet or attachment assembly 250 itself (in addition to the hook portion 152) can also be reduced because of the absorption and dampening of impact when the cover 240 is flexed and/or when the attachment assembly 250 is at least partially recessed into the upper portion 230 and into the housing 12.

Although the embodiment of FIG. 17 generally depicts a vertical compression of the flexible cover 240, this is just one example of the type of movement or displacement that can be accomplished by the flexible cover 240. That is, as previously noted, the flexible cover 240 may be flexed, collapsed, compressed, moved, pivoted, and/or displaced upwardly and rearwardly (e.g., into the cover receiving void 231). Referring to FIG. 7B, in an embodiment, the flexible cover 240 as depicted, for example, is configured for hinged movement (relative to rigid surface 19 and top surface 13 of the housing 12) rearwardly back into the cover receiving void 231 of the upper portion 230 of the opening 22 when force is applied thereon due to impact by the attachment assembly 250 and/or end hook member 34 (this hinged movement may be alternative to, or in addition to, other flexural movement). As previously noted, the flexible cover 240 flexes, collapses, moves, compresses, pivots, and/or displaces upwardly by at least ⅛" upon impact of force to at least the end hook member 34, and may, in some embodiments, be moved or displaced between ⅛" and ½". This at least ⅛" movement of the flexible cover 240 may be referred to as a height difference $H_F$ of the flexible cover 240. The height difference $H_F$ of the flexible cover 240 refers to a difference in height of the bottom of the flexible cover 240 in a first (unflexed) position as compared to the height of the bottom of the flexible cover 240 in a second (flexed) position, as shown in FIG. 7A. In accordance with an embodiment, then, the difference between D and D2—which is the height difference $H_F$—is ⅛" (e.g., (D–D2)=$H_F$=⅛"). In another embodiment, the height difference $H_F$ between D and D2 between ⅛" and ½".

Nonetheless, if an attachment assembly 250 is not attached to (e.g., selectively removed from) the blade 16 or end hook member 34, it should be understood that the end hook member 34 alone may be configured to flex the flexible cover 240 in a similar or the same manner as described with respect to the end hook member 34 with attachment assembly 250 as shown in the exemplary illustrations of FIGS. 7-17. That is, the end hook member 34 can move upwards, and, accordingly, the cover 240 can be flexed, collapsed, moved, pivoted, displaced and/or compressed by a portion of the end hook member 34. In an embodiment, the mounting portion 150 of the end hook member 34 is configured to engage and flex the flexible cover 240. In an embodiment, the hook portion 152 of the end hook member 34 is configured to flex the flexible cover 240. In another embodiment, portions of the free end of the blade 16 can be moved to flex the flexible cover 240.

When the force applied to the end hook member 34 is released, the end hook member 34 moves back such that it moved out of the upper portion 230 and its bottom edge 177 extends below the bottom surface 109 of the housing 12, as the flexible cover 240 un-flexes or expands and moves back to cover the upper portion 230.

Further, it is noted that the attachment assembly 250 may be used with one or more of the embodiments as shown in FIG. 18, FIG. 19, and/or FIG. 20. At least based on the description herein, one of ordinary skill in the art understands how the attachment assembly 250 would impact each of their respective elements 270, 280, and 252, and how each is configured to flex and absorb impact force that may be applied to the end hook 34 when it is impacted at least on its bottom edge 177 by an impact force. Further, it should be understood that application of an attachment assembly 250 to any one of FIGS. 18-20 would not only flex the flexible covers 270, 280, and 252, but also allow movement of the mounting portion 150 of the end hook member 34, and attachment assembly 250, into the upper portion of the opening 22, inside the housing 12, as previously described.

Furthermore, in accordance with yet another embodiment, the attachment assembly 250 may provide the flexible cover. In one embodiment, the flexible cover is configured for attachment to a free end of the elongated blade 16 (e.g., to the blade 16 itself, to the rivets 169, and/or to the end hook member 34) via the attachment assembly 250. For example, designs similar to the flexible covers 270, 280, and/or 252 of FIGS. 18-20 may be provided on an attachment assembly 250 such that when the elongated blade 16 is in the fully retracted position, the flexible cover on the attachment assembly 250 inhibits penetration of debris into the housing 12, and is positioned to be flexed or compressed between the upper surface of the hook mounting portion 150 (and/or the blade 16) and the portion of the housing immediately above the attachment assembly (e.g., at the mouth) upon impact by force on the bottom edge 177 of the end hook member 34 when the elongated blade is in the fully retracted position to absorb force from the impact. It may further permit movement of the attachment assembly 250 and/or permit movement of the end hook member rearwardly into portions of the upper portion 230 that are behind the attachment assembly 250 when the device is at rest. In one embodiment, the attachment assembly 250 includes a flexible cover extending upwardly in the upper portion 230 of the opening 22. In another embodiment, the attachment assembly 250 includes a flexible cover having a body with a cavity therein. The cavity may include a gas, a gel, a liquid, or a combination thereof in yet another embodiment.

The formation and/or manufacturing of the flexible cover, in any of the embodiments disclosed herein, is not limited. For example, in one embodiment, the flexible cover is integrally molded with the housing 12. In another embodiment, the flexible cover is integrally molded with the grip cover 110. In another embodiment, the flexible cover is formed as a separate component from the tape rule assembly 10 and may be later attached (i.e., retrofitted) to one or more parts of the assembly 10. For example, the flexible cover may be attached after full assembly, or after the point of sale. In another embodiment, the flexible cover is attached to the housing 12 or the grip cover 110. In yet another embodiment, the flexible cover is attached to an attachment assembly 250. Also, the devices or methods of attachment of a separate flexible cover to the tape rule assembly 10 may vary. In some embodiments, attachment devices or methods may include, but are not limited to: bonding, adhesive, snap fit, friction fit, and releasable connector(s) (e.g., button(s), snap(s), hook and loop materials (e.g., Velcro®)).

It is within an embodiment of this disclosure to have a rule assembly 10, such as shown in and described with reference to the FIGS. above, that includes a flexible cover 240, 252, 265, or 280 overhanging (and at least partially occupying) an upper portion 230 in the housing 12 near the tape mouth or opening 22, that allows an end hook member 34 on the blade 16 to absorb an impact force via flexing the flexible cover, and allowing at least the end hook member 34 to selectively recede (e.g., when dropped) into the upper portion 230 of the opening 22 to substantially prevent damage to the hook, and while also providing a cover for the opening 22 to inhibit and/or substantially prevent penetration of debris into the opening 22 and housing 12.

In an embodiment, the flexible cover may extend into rearward portions of the upper portion 230, e.g., into the housing, such as shown by flexible cover 280 of FIG. 19 and flexible cover 252 of FIG. 20, for example.

In one embodiment, the end hook member 34 initially contacts the flexible cover 240, 252, 265, or 280 prior to the bottom 177 of the hook portion 34 being at the height of the bottom surface 109 of the housing 12. The flexible cover 240, 252, 265, or 280 flexes sufficiently to enable the bottom 177 of the end hook member 34 to reach the height of the bottom surface 109 of the housing 12.

The shapes, as shown, are not intended to limit the end hook member 34 design in any way. For example, the shape(s) of the hook portion 152 is not limited, including its curves and edges. The end hook member 34 may be formed of ferrous or non-ferrous materials.

Moreover, it should be understood that the use of similar reference numerals throughout the Figures includes the correlated description for each feature, even if such features are not necessarily repeated with respect to each of the described embodiment(s). For example, it should be understood that reference to tape rule assembly 10, housing 12, reel 14, elongated blade 16 and end hook member 34 throughout the embodiments of this disclosure can include any of the previously described features. For purposes of clarity and brevity, like elements and components throughout the Figures are labeled with same designations and numbering as discussed with reference to FIGS. 1-17. Thus, although not discussed entirely in detail herein, one of ordinary skill in the art should understand that various features associated with the tape measure assembly 10 of FIGS. 18-21B can be applied to the embodiments of FIGS. 1-17 and vice versa. Additionally, it should be understood that the features shown in each of the individual figures is not meant to be limited solely to the illustrated embodiments. That is, the features described throughout this disclosure may be interchanged and/or used with other embodiments than those they are shown and/or described with reference to.

In any of the foregoing embodiments, it should be understood, that the flexible cover can be optionally configured to absorb impact of the hook member 34 against the housing 12 when the blade 16 is wound into the housing 12 under the force of the internal coil spring (e.g., spring 32). In one embodiment, the flexible cover can stand forwardly proud of the rigid portions of the housing 12, and/or be provided with sufficient flexibility and/or compressibility, such that the cover can deflect or be displaced rearwardly upon spring-retracted impact by the hook member 34 (in contrast with upward impact resulting from dropping the tape measure device that it lands on the hook member 34). The displacement or compression of the flexible cover (e.g., 240, 252, 265, 280, for example) may take place in a rearward direction (e.g., into the region of void 231 of the upper portion 230, behind the flexible cover when it is in an unflexed, neutral position). It should be appreciated, however, that the displacement/compression of the flexible cover can be compression only (e.g., see FIG. 17), and need not comprise rearward movement of the cover into the housing (e.g., into void 231) (e.g., see FIG. 7B). In one embodiment, the amount of rearward displacement, deflection of movement of at least a portion of the flexible cover upon impact is at least ⅛". In another embodiment, the deflection of movement of at least a portion of the flexible cover is at least 3/16". In another embodiment, the deflection of movement of at least a portion of the flexible cover is at least ¼". Such rearward displacement can be an instantaneous compression or deflection upon impact. The impact can be with the lower hook portion 152 of any type hook, and/or leg sections 162 (if such leg sections are provided).

The term "blade" as used herein should be construed as a generic term to cover metal blades as well as non-metal blades (e.g., made of plastic, fabric, elastomer, and/or other materials or combinations thereof).

The term "flexible" or "flexed" (or forms thereof) as used herein in connection with the flexible cover also encompasses compression, bending, and articulating. The flexible cover—in any of the disclosed embodiments, including those not illustrated (e.g., a flexible cover on an attachment assembly) may include a resilient material or structure, or a combination of both rigid and resilient materials or structures. Such structures can include, for example, elastomer, rubber, plastic, cushion material, foam material, and/or resilient spring, alone or in combination with other, more rigid, structures.

Although the disclosure has been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. In addition, it is to be understood that the present disclosure contemplates that, to the extent possible, one or more features of any embodiment can be combined with one or more features of any other embodiment.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A rule assembly comprising:
   a housing;
   a reel rotatably mounted in the housing;
   an elongated blade arranged to be wound on the reel and having a free end configured to extend through an opening in the housing;
   an end hook member attached to the free end of the elongated blade, the end hook member including a mounting portion connected to the free end of the elongated blade and a hook portion extending generally perpendicularly from the mounting portion at the free end of the elongated blade;
   the hook portion being constructed and arranged to extend downwardly below a bottom surface of the housing when at the opening in the housing, when the elongated blade is in a fully retracted position;

the opening having an upper portion disposed above the elongated blade and the mounting portion when the elongated blade is in the fully retracted position;

the housing having a flexible cover overhanging the upper portion of the opening to inhibit penetration of debris into the opening, wherein the flexible cover is positioned to be flexed by the end hook member upon impact by force thereon to absorb force from the impact and permit movement of the end hook member into the upper portion of the opening, and wherein the flexible cover includes ridges therein to facilitate flexion of the flexible cover in at least substantially vertical direction when impacted by the force from the end hook member.

2. A rule assembly comprising:

a housing;

a reel rotatably mounted in the housing;

an elongated blade arranged to be wound on the reel and having a free end configured to extend through an opening in the housing;

an end hook member attached to the free end of the elongated blade, the end hook member including a mounting portion connected to the free end of the elongated blade and a hook portion extending generally perpendicularly from the mounting portion at the free end of the elongated blade;

the hook portion being constructed and arranged to extend downwardly below a bottom surface of the housing when at the opening in the housing, when the elongated blade is in a fully retracted position;

the opening having an upper portion disposed above the elongated blade and the mounting portion when the elongated blade is in the fully retracted position;

the housing having a flexible cover overhanging the upper portion of the opening to inhibit penetration of debris into the opening, wherein the flexible cover is positioned to be flexed by the end hook member upon impact by force thereon to absorb force from the impact and permit movement of the end hook member into the upper portion of the opening, wherein the upper portion of the opening has a height dimension extending above the hook portion that exceeds a height dimension of a portion of the hook portion that extends downwardly below the bottom surface of the housing.

3. A rule assembly comprising:

a housing;

a reel rotatably mounted in the housing;

an elongated blade arranged to be wound on the reel and having a free end configured to extend through an opening in the housing;

an end hook member attached to the free end of the elongated blade, the end hook member including a mounting portion connected to the free end of the elongated blade and a hook portion extending generally perpendicularly from the mounting portion at the free end of the elongated blade;

the hook portion being constructed and arranged to extend downwardly below a bottom surface of the housing when at the opening in the housing, when the elongated blade is in a fully retracted position;

the opening having an upper portion disposed above the elongated blade and the mounting portion when the elongated blade is in the fully retracted position;

the housing having a flexible cover overhanging the upper portion of the opening and comprising a body that extends into a majority of the opening to inhibit penetration of debris into the opening, wherein the flexible cover is positioned to be flexed by the end hook member upon impact by force thereon to absorb force from the impact and permit movement of the end hook member into the upper portion of the opening, wherein the body of the flexible cover further comprises a material-containing cavity therein.

4. The assembly according to claim 3, wherein the cavity is filled with a gas, a gel, a liquid, or a combination thereof.

5. The assembly according to claim 3, wherein the housing and body are formed from an Acrylonitrile Butadiene Styrene (ABS) plastic.

6. A rule assembly comprising:

a housing;

a reel rotatably mounted in the housing;

an elongated blade arranged to be wound on the reel and having a free end configured to extend through an opening in the housing;

an end hook member attached to the free end of the elongated blade, the end hook member including a mounting portion connected to the free end of the elongated blade and a hook portion extending generally perpendicularly from the mounting portion at the free end of the elongated blade;

the hook portion being constructed and arranged to extend downwardly below a bottom surface of the housing when at the opening in the housing, when the elongated blade is in a fully retracted position;

the opening having an upper portion disposed above the elongated blade and the mounting portion when the elongated blade is in the fully retracted position; and a flexible cover covering at least partially the upper portion of the opening to inhibit penetration of debris into the opening, wherein the flexible cover is configured to be flexed at least ⅛" upon impact that forces the free end of the blade upwards when the elongated blade is in the fully retracted position.

7. The assembly according to claim 6, wherein the flexible cover extends over a majority of the upper portion of the opening.

8. The assembly according to claim 6, wherein the flexible cover is flexed or moved at least partially into the upper portion of the opening upon impact by force.

9. The assembly according to claim 6, wherein the flexible cover comprises a resilient material or a compressible material.

10. The assembly according to claim 9, wherein the flexible cover is made from TPU or TPE.

11. The assembly according to claim 6, further comprising a grip cover made of elastomeric material on the housing and wherein the flexible cover is part of the grip cover.

12. The assembly according to claim 6, wherein the flexible cover comprises a resilient hinge.

13. The assembly according to claim 6, wherein, in a first position, the hook portion extends downwardly below the bottom surface of the housing, and the flexible cover overhangs the opening; and wherein, in a second position, a bottom portion of the hook portion is substantially in line with the bottom surface of the housing and the flexible cover is flexed by the end hook member.

14. The assembly according to claim 13, wherein the flexible cover is flexed at least partially into the upper portion of the opening in the first portion to enable movement of the hook portion such that the bottom portion of the hook portion moves to be substantially in line with the bottom surface of the housing.

15. The assembly according to claim 6, further comprising an attachment assembly attached on the free end of the elongated blade, and wherein the attachment assembly is configured to flex the flexible cover and at least partially extend into the upper portion of the opening when the elongated blade assembly is in the fully retracted position.

16. The assembly according to claim 6, further comprising an attachment assembly attached on the free end of the elongated blade, and wherein the flexible cover is part of the attachment assembly.

17. The assembly according to claim 6, wherein the flexible cover is part of the housing, and wherein the flexible cover overhangs at least part of the upper portion of the opening.

18. The assembly according to claim 6, wherein the flexible cover is configured to flex between ⅛" and ½".

19. The assembly according to claim 6, wherein the impact is upon the end hook member.

20. The assembly according to claim 6, wherein, in a first position, the hook portion extends downwardly below the bottom surface of the housing; and
wherein, in a second position, a bottom portion of the hook portion is substantially in line with the bottom surface of the housing and the flexible cover is flexed by the end hook member.

21. The assembly according to claim 6, further comprising an attachment assembly attached at the free end of the elongated blade, and wherein, upon upward impact on the end hook member, the attachment assembly contacts the flexible cover such that the flexible cover is flexed.

22. The assembly according to claim 6, further comprising an attachment assembly attached to the end hook member, and wherein force upon impact is translated through the end hook member to the attachment assembly to flex the flexible cover.

23. The assembly according to claim 6, further comprising a hook attachment attached to the end hook member, wherein the hook attachment extends downwardly relative to the mounting portion of the end hook member, and wherein the hook attachment is configured for receipt of the impact, such impact being translated to the end hook member.

24. A rule assembly comprising:
a housing;
a reel rotatably mounted in the housing;
an elongated blade arranged to be wound on the reel and having a free end configured to extend through a mouth in the housing;
an end hook member attached to the free end of the elongated blade, the end hook member including a mounting portion connected to the free end of the elongated blade and a hook portion extending generally perpendicularly from the mounting portion at the free end of the elongated blade;
the hook portion being constructed and arranged to extend downwardly below a bottom surface of the housing when at the mouth in the housing, when the elongated blade is in a fully retracted position;
an attachment assembly configured to be attached at the free end of the elongated blade; and
a flexible cover disposed above the elongated blade and the attachment assembly when the elongated blade is in the fully retracted position to inhibit penetration of debris into the housing,
wherein the flexible cover is positioned to be flexed by the attachment assembly upon impact by force on at least the end hook member when the elongated blade is in the fully retracted position to absorb force from the impact and permit movement of the end hook member in the vertical direction,
further comprising one or more rivets configured mount the end hook member to the elongated blade, and wherein the attachment assembly is attached to the one or more rivets.

25. The assembly according to claim 24, wherein the attachment assembly is attached to the end hook member.

26. The assembly according to claim 24, wherein the attachment assembly is attached to the elongated blade.

27. The assembly according to claim 24, wherein the flexible cover is attached to the housing.

28. A rule assembly comprising:
a housing;
a reel rotatably mounted in the housing;
an elongated blade arranged to be wound on the reel and having a free end configured to extend through a mouth in the housing;
an end hook member attached to the free end of the elongated blade, the end hook member including a mounting portion connected to the free end of the elongated blade and a hook portion extending generally perpendicularly from the mounting portion at the free end of the elongated blade;
the hook portion being constructed and arranged to extend downwardly below a bottom surface of the housing when at the mouth in the housing, when the elongated blade is in a fully retracted position;
an attachment assembly configured to be attached at the free end of the elongated blade; and
a flexible cover disposed above the elongated blade and the attachment assembly when the elongated blade is in the fully retracted position to inhibit penetration of debris into the housing,
wherein the flexible cover is positioned to be flexed by the attachment assembly upon impact by force on at least the end hook member when the elongated blade is in the fully retracted position to absorb force from the impact and permit movement of the end hook member in the vertical direction;
wherein, in a first position, the attachment assembly is spaced from the flexible cover; and
wherein, in a second position, a bottom portion of the hook portion is substantially in line with the bottom surface of the housing and the flexible cover is flexed by one of: the end hook member and the attachment assembly.

29. The assembly according to claim 28, wherein in the first position, the attachment assembly is in contact with the flexible cover.

30. The assembly according to claim 29, wherein in the second position, the attachment assembly further flexes or compresses the flexible cover upon the impact on at least the end hook member when the elongated blade is in the fully retracted position.

31. The assembly according to claim 28, wherein the flexible cover is flexed at least partially in the first position such that the bottom portion of the hook portion moves to be substantially in line with the bottom surface of the housing.

32. The assembly according to claim 31, wherein the flexible cover is further flexed or compressed in the second position.

\* \* \* \* \*